(12) United States Patent
Khoche

(10) Patent No.: US 10,671,905 B2
(45) Date of Patent: Jun. 2, 2020

(54) ERROR BASED LOCATIONING OF A MOBILE TARGET ON A ROAD NETWORK

(71) Applicant: Trackonomy Systems, Inc., Santa Clara, CA (US)

(72) Inventor: Ajay Khoche, West San Jose, CA (US)

(73) Assignee: Trackonomy Systems, Inc., Santa Clara, CA (US)

( * ) Notice: Subject to any disclaimer, the term of this patent is extended or adjusted under 35 U.S.C. 154(b) by 0 days.

(21) Appl. No.: 16/587,300

(22) Filed: Sep. 30, 2019

(65) Prior Publication Data

US 2020/0034680 A1    Jan. 30, 2020

Related U.S. Application Data

(63) Continuation of application No. 15/842,840, filed on Dec. 14, 2017, now Pat. No. 10,482,369.
(Continued)

(51) Int. Cl.
*G06K 19/077* (2006.01)
*G06K 19/06* (2006.01)
(Continued)

(52) U.S. Cl.
CPC ........ *G06K 19/07773* (2013.01); *B32B 37/06* (2013.01); *B32B 37/12* (2013.01); *C09J 7/38* (2018.01); *G06K 19/06037* (2013.01); *G06K 19/0702* (2013.01); *H04W 4/029* (2018.02); *B32B 2457/00* (2013.01);
(Continued)

(58) Field of Classification Search
CPC .... G01C 21/34; G01C 21/3476; G01C 21/14; G01C 21/3602; G01C 21/3644; G01C 21/3691; G01C 21/16; G01C 21/28; G01C 21/30; G01C 21/12; G01C 21/005; G01C 21/206; G01C 21/10; G01C 21/367; G05D 2201/0213; G05D 1/0212; G05D 1/0278; G05D 1/0287; G05D 1/0274; G05D 1/0223; G05D 1/0231; G05D 1/0268; G05D 1/0276; G05D 2201/0207; G06K 9/00818;
(Continued)

(56) References Cited

U.S. PATENT DOCUMENTS 7,048,194 B2    5/2006    Minami et al.
7,177,054 B2    2/2007    Silverbrook et al.
(Continued)

FOREIGN PATENT DOCUMENTS

JP    2008239282 A    10/2008

*Primary Examiner* — Kwasi Karikari
(74) *Attorney, Agent, or Firm* — Law Offices of Edouard Garcia

(57) ABSTRACT

Methods, systems, apparatus, and tangible non-transitory carrier media encoded with one or more computer programs that can determine the path or route most likely navigated by a mobile target are described. In accordance with particular embodiments, the most likely path or route is determined based on path-based scoring of position estimates obtained from different types of complementary locationing signal sources. Instead of fusing the position data derived from the different types of signal sources, these particular embodiments determine the most likely path navigated by the mobile target based on an independent aggregation of the position estimates derived from complementary signals of different source types.

20 Claims, 12 Drawing Sheets

Related U.S. Application Data

(60) Provisional application No. 62/434,218, filed on Dec. 14, 2016, provisional application No. 62/435,207, filed on Dec. 16, 2016.

(51) Int. Cl.
| | |
|---|---|
| *H04W 4/029* | (2018.01) |
| *G06K 19/07* | (2006.01) |
| *C09J 7/38* | (2018.01) |
| *B32B 37/06* | (2006.01) |
| *B32B 37/12* | (2006.01) |
| *H04W 4/02* | (2018.01) |

(52) U.S. Cl.
CPC .... *C09J 2201/128* (2013.01); *C09J 2201/606* (2013.01); *C09J 2203/326* (2013.01); *C09J 2205/10* (2013.01); *C09J 2463/00* (2013.01); *H04W 4/027* (2013.01)

(58) Field of Classification Search
CPC ........... G06K 9/00791; G06K 9/00798; G06K 9/3258; G06K 2209/21; G06K 9/46
See application file for complete search history.

(56) References Cited

U.S. PATENT DOCUMENTS

| | | | |
|---|---|---|---|
| 7,299,990 | B2 | 11/2007 | Hoshina |
| 7,540,603 | B2 | 6/2009 | Otsuki |
| 8,072,620 | B2 | 12/2011 | Yamamoto et al. |
| 8,292,173 | B2 | 10/2012 | Yturralde et al. |
| 2012/0271540 | A1* | 10/2012 | Miksa ................... G01S 13/865 701/409 |
| 2013/0131980 | A1* | 5/2013 | Ginsberg ............... G01C 21/30 701/446 |
| 2013/0250357 | A1 | 9/2013 | Yu |
| 2018/0003507 | A1* | 1/2018 | Arslan ................. G01C 21/165 |

\* cited by examiner

ERROR BASED LOCATIONING OF A MOBILE TARGET ON A ROAD NETWORK

CROSS-REFERENCE TO RELATED APPLICATIONS

This application claims the benefit of U.S. Provisional Application No. 62/434,218, filed Dec. 14, 2016, and U.S. Provisional Application No. 62/435,207, filed Dec. 16, 2016, both of which are incorporated herein by reference.

BACKGROUND

Locationing systems can track mobile targets in real time. These systems typically ascertain information relating to their geographic locations based on communications with a variety of different wireless locationing systems (e.g., the Global Positioning System (GPS), cellular network systems (e.g., GSM), and wireless local area networks (e.g., a system of Wi-Fi access points). No single approach, however, provides continuous tracking information under all circumstances. For example, GPS tracking requires a tracking device to have an unobstructed view of at least four GPS satellites at the same time, making GPS tracking in urban and indoor environments problematic. Dead-reckoning may be used to supplement GPS locationing when GPS signals are unavailable or inaccurate (e.g., as a result of signal multipath error). However, dead-reckoning navigation is limited by the rapid accumulation of errors and, requires a complex fusion process to integrate dead-reckoning navigation data with GPS navigation data. Map-matching techniques can improve locationing accuracy by identifying the most likely locations of a vehicle on a road network. However, the accuracy of map-matching techniques depends significantly on the accuracy of the position estimates for the mobile target being tracked and the fidelity of the spatial road map used to locate the mobile target in a geographic region.

SUMMARY

Embodiments of the subject matter described herein include methods, systems, apparatus, and tangible non-transitory carrier media encoded with one or more computer programs for determining the path or route most likely navigated by a mobile target.

In accordance with particular embodiments, systems are implemented by one or more computers (or processors) executing one or more computer programs that can determine the path or route most likely navigated by a mobile target using path-based scoring of position estimates obtained from different types of complementary locationing signal sources (e.g., sources of different signal types with respective locationing reliabilities or accuracies that generally are independent or uncorrelated). In some examples, the signal sources are selected from satellite signal sources, dead-reckoning signal sources, and terrestrial wireless communication signal sources. Instead of fusing the position data derived from the different types of signal sources, these example systems determine the most likely path navigated by the mobile target based on an independent aggregation of the position estimates derived from complementary signals of different source types. In this way, these systems can achieve enhanced locationing results without requiring complex processes for fusing the different locationing modalities.

In accordance with particular embodiments, a window identifies respective sets of position estimates for a mobile target over different intervals of time or space. The position estimates are determined from complementary locationing signal sources (e.g., sources of different signal types with respective locationing reliabilities or accuracies that generally are independent or uncorrelated). In some embodiments, the signal sources are selected from satellite signal sources, dead-reckoning signal sources, and terrestrial wireless communication signal sources. For each interval, the respective set of position estimates is used to score respective paths (e.g., sequences of connected road segments) that are defined in a predetermined geographic map of a road network, and the path most likely to have been navigated by the mobile target is determined based on the path scores. The window typically identifies an interval of position estimates that covers enough of the spatial path structures and interconnections between the segments of the road network that isolated or localized path selection errors can be corrected over one or more future intervals without having to re-evaluate past intervals that are outside the current interval and without having to identify and track restricted sets of potential paths over time.

Embodiments of the subject matter described herein can be used to overcome the above-mentioned limitations in prior approaches and thereby achieve the following advantages. For example, by re-evaluating portions of previously selected paths based on present locationing estimates, particular embodiments enable current data to be used to correct past path selection mistakes. Particular embodiments also increase the likelihood of avoiding current path selection mistakes by incorporating past locationing estimates into the current path selection process. In this way, the particular window-based path selection embodiments described in this specification can be computationally efficient while still achieving high locationing accuracy and robustness in determining the current location of a mobile target and in determining where the mobile target has been. Such enhanced location information may be used to support a wide variety of applications, including vehicle tracking, asset tracking, location-based forensic investigations, and route optimization.

Some location signals have different levels of accuracy or reliability. In one embodiment, the assessment of accuracy is used to weight the impact a certain measurement can have on the final outcome.

In particular embodiments, during the training phase, a reference table is created to compensate for systematic defects or interferences. In some examples, the reference table is used to correct clear outliers that are impossible given the actual or estimated speed of the object (or maximum speed) or other data sources (such as road, acceleration or compass measurements).

In particular embodiments, the same measurements get repeated multiple time and averaged in order to reduce or minimize stochastic defects.

In particular embodiments, the various location signals get scheduled or perhaps never used depending on battery life requirements, cost requirements and desired tracking requirements. In some examples, the system evaluates all potential scenarios and generates the most attractive solution.

Other features, aspects, objects, and advantages of the subject matter described in this specification will become apparent from the description, the drawings, and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The instant specification describes systems, methods, and non-transitory computer storage media encoded with a computer program product comprising instructions that, when executed by one or more computers, cause the one or more computers to perform operations for determining the path or route most likely navigated by a mobile target. Examples of the subject matter described herein combine path-based scoring with position estimates obtained from multiple complementary sources of different respective locationing signal source types. Some of these examples include a window that identifies respective sets of position estimates for scoring the potential paths of the mobile target over respective intervals.

Figure 1:
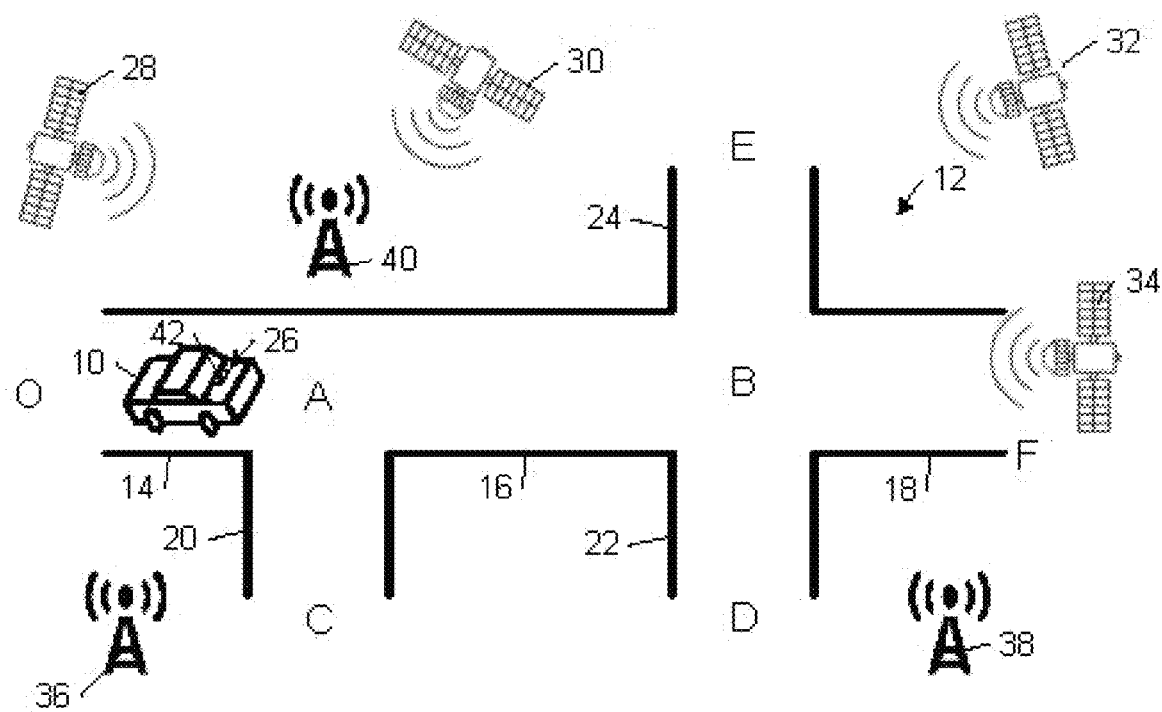
FIG. 1 is a schematic diagram showing a mobile target on a road network and a plurality of locationing system in a geographic region.

FIG. 1 shows an example mobile target 10 on a road network 12. The mobile target 10 may be, e.g., a person, a vehicle, or other entity. In the depicted example, the road network 12 includes a plurality of road segments 14, 16, 18, 20, 22, 24 that are interconnected at respective intersections O, A, B, C, D, E, F.

The mobile target 10 includes a tracking system 26 that is configured to determine or assist in determining the geographic location of the mobile target 10 on the road network 12. The tracking system 26 includes wireless communications components and one or more local sensing components that facilitate the determination of position estimates for the mobile target 10. The wireless communications components include, for example, antennas, receivers, and/or transceivers that enable wireless communications with one or more remote locationing systems. Examples of remote locationing systems include, satellite locationing systems 28, 30, 32, 34 (e.g., a Global Positioning System (GPS)/Global Navigation Satellite System (GNSS), GLONASS, and NAVSTAR), terrestrial wireless communication systems 36, 38, 40 (e.g., cellular network systems (e.g., GSM, GPRS, and CDMA), wide area wireless communication networks (e.g., Long Range (LoRa) wide-area network), and short range wireless communication networks (e.g., Wi-Fi, Bluetooth, and other wireless access point technologies). The local sensing components can include, for example, one or more accelerometers, gyroscopes, and magnetometers, which may be configured to provide one or more dead-reckoning locationing signals (e.g., signals for determining distances traveled and heading changes).

Figure 2:
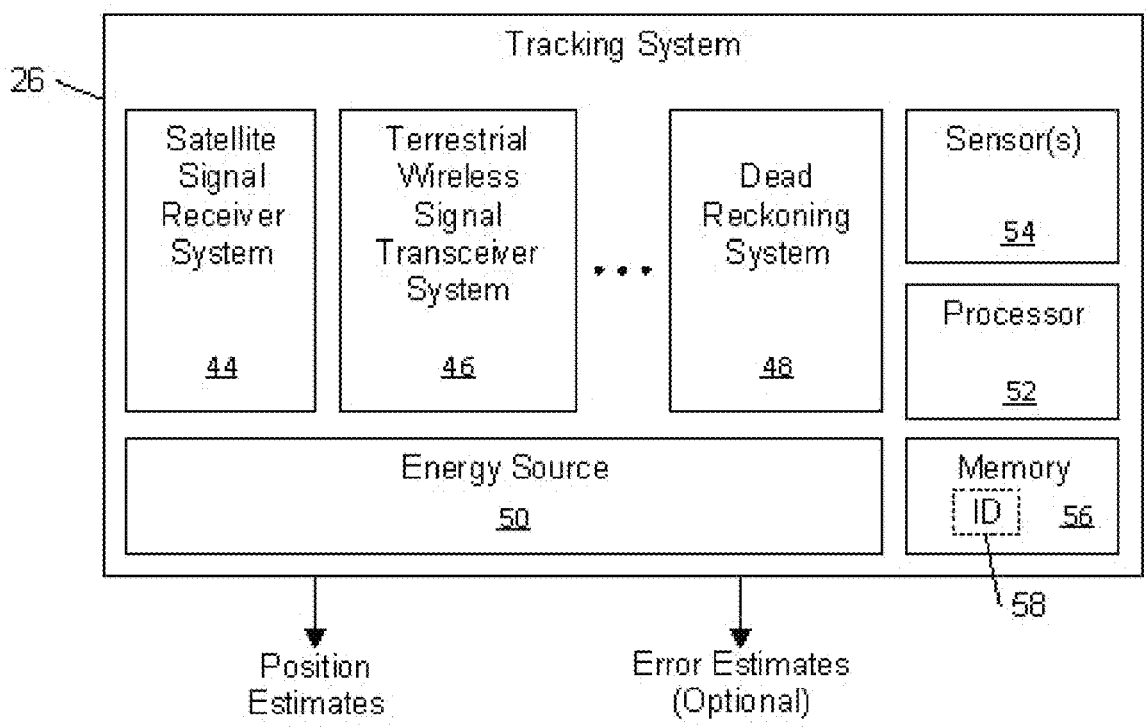
FIG. 2 is a block diagram of an example tracking system.

FIG. 2 shows a block diagram of a particular embodiment of the tracking system 26. The tracking system 26 includes a satellite receiver system 44, a terrestrial wireless signal transceiver system 46, a dead-reckoning system 48, an energy source 50, a processor 52, and, optionally, one or more sensors 54. An example satellite signal receiver system 44 includes a GPS system that includes a GPS receiver circuit (e.g., a receiver semiconductor circuit) and a GPS antenna. An example terrestrial wireless signal transceiver 46 system includes one or more wireless communication systems each of which includes a respective transceiver circuit (e.g., a transceiver semiconductor circuit) and a respective antenna. Example wireless communication systems include a cellular communication system (e.g., GSM/GPRS), a wide area RF communication system (e.g., LoRa), a Bluetooth communication system (e.g., a Bluetooth Low Energy system), a Z-wave communication system, and a ZigBee communication system. An example dead-reckoning system 48 includes, for example, an inertial measurement unit (IMU) that incorporates one or more accelerometers, gyroscopes, and magnetometers. The tracking system 26 also includes an energy source 50 (e.g., a printed flexible battery or a conventional single cell or multi-cell battery), a processor 52 (e.g., a microcontroller or microprocessor), and, optionally, one or more sensors 54. Example sensors 54 include a capacitive sensor, an altimeter, a gyroscope, an accelerometer, a temperature sensor, a strain sensor, a pressure sensor, a light sensor, and a humidity sensor. In some examples, the tracking system 26 includes a memory 56 for storing data (e.g., localization data and a unique identifier 58 associated with the tracking system 26). In some examples, the memory 56 may be incorporated into one or more of the processor 52 or sensors 54, or may be a separate component that is integrated in the tracking system 26 as shown in FIG. 2.

Referring back to FIG. 1, in operation, the tracking system 26 receives a respective sequence of locationing signals from each of multiple sources of different respective locationing signal source types, including a satellite 28, 30, 32, 34 signal source type (e.g., GPS/GNSS), a terrestrial wireless communication system 36, 38, 40 signal source type (e.g., GSM, GPRS, CDMA, LoRa, etc.), and a dead-reckoning system 48 signal source type (e.g., gyroscope, accelerometer, magnetometer, and/or IMU signal source). In some examples, the tracking system 26 is configured to ascertain its own respective geographic position estimates on the road network 12 from the signals received from one or more of the dead-reckoning signal sources, the satellite based locationing system sources, and the terrestrial wireless communication locationing system sources in accordance with the methods described in this specification. In other examples, the tracking system 26 transmits the locationing signals that it receives from one or more of the dead-reckoning signal sources, the satellite based locationing system sources, and the terrestrial wireless communication locationing system sources to a remote network tracking service that processes the data received from the tracking system 26 to determine, for example, the geographic locations of the tracking system 26 on the road network 12 in accordance with the methods described in this specification.

Figure 3:
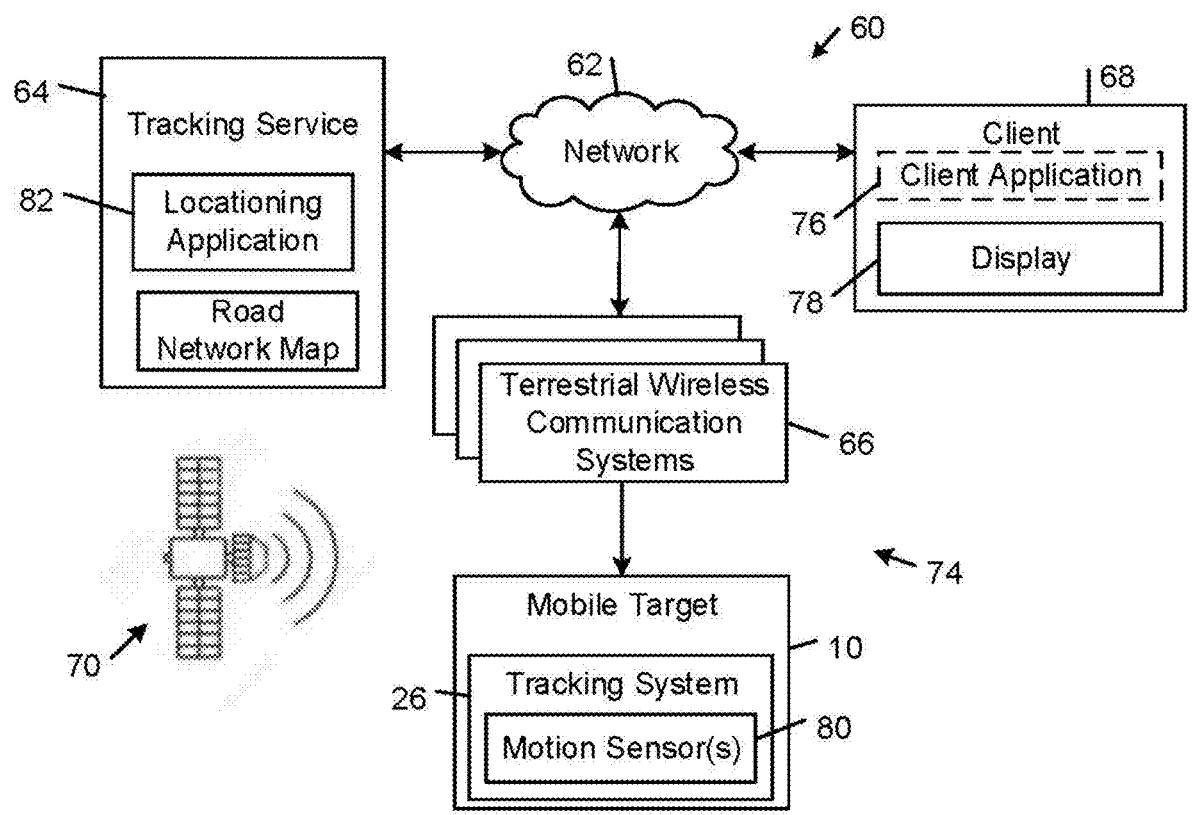
FIG. 3 is a diagrammatic view of an example network environment that communicates with the example tracking system of FIG. 3.

FIG. 3 shows an example network environment 60 that includes a network 62 that supports communications between the mobile target 10, a tracking service 64, one or more terrestrial wireless communication systems 66, a client device 68, and one or more satellite based tracking systems 70. The network 62 includes one or more network communication systems and technologies, including any one or more of wide area networks, local area networks, public networks (e.g., the internet), private networks (e.g., intranets and extranets), wired networks, and wireless networks. The terrestrial wireless communication systems 66 include, for example, any one or more of wireless cellular communication systems (e.g., GSM, GPRS, CDMA), wireless wide area communication networks (e.g., LoRa), and wireless local area communication networks (e.g., wireless access points, such as Wi-Fi, Bluetooth, and ZigBee). The client device 68 includes a client application 76 and a display 78. The client application 76 establishes sessions with the tracking service 64 during which the client application 76 obtains information regarding the locations of the tracking system 26. The information may include, for example, the current location of a particular tracking system 26, the physical route traveled by the tracking system 26 over time, stopover locations and durations, and state and/or changes in state information (as measured by one or more sensors associated with the tracking system 26). The information may be presented in a user interface on the display 78. Location and state information may be presented in the user interface in any of a variety of different ways, including in a table, chart, or map. In some examples, the location and state data presented in the user interface are updated in real time.

As explained in the following paragraphs, location data for one or more tracking systems 26 can be obtained using one or more of the locationing systems and technologies described above.

For example, a tracking system 26 that includes a GPS receiver is operable to receive location data (e.g., geolocation data) from the Global Positioning System (GPS). In this process, the tracking system 26 periodically monitors signals from multiple GPS satellites. Each signal contains information about the time the signal was transmitted and the position of the satellite at the time of transmission. Based on the location and time information for each of four or more satellites, the GPS receiver determines the geolocation of the tracking system 26 and the offset of its internal clock from true time. Depending on its configuration, the tracking system 26 can either forward the received GPS location data to the tracking service 64 to determine its geolocation, or first compute geolocation coordinates from the received GPS location data and report the computed geolocation coordinates to the tracking service 64. However, the tracking system 26 can only determine its GPS location when it is able to receive signals from at least four GPS satellites at the same time. As a result, GPS localization typically is limited or unavailable in urban environments and indoor locations.

Instead of or in addition to GPS localization, the tracking system 26 can be configured to determine or assist in determining its location using terrestrial locationing techniques. For example, Received Signal Strength Indicator (RSSI) techniques may be used to determine the location of the tracking system 26. These techniques include, for example, fingerprint matching, trilateration, and triangulation. In an example RSSI fingerprinting process, one or more predetermined radio maps of a target area are compared to geo-reference RSSI fingerprints that are obtained from measurements of at least three wireless signal sources (e.g., cellular towers or wireless access points) in the target area to ascertain the location of the tracking system 26. The predetermined radio maps typically are stored in a database that is accessible by the tracking service 64. In example RSSI triangulation and trilateration processes, the location of a tracking system 26 can be determined from measurements of signals transmitted from at least three omnidirectional wireless signal sources (e.g., cellular towers or wireless access points). Examples of the triangulation and trilateration localization techniques may involve use of one or more of time of arrival (TOA), angle of arrival (AOA), time difference of arrival (TDOA), and uplink-time difference of arrival (U-TDOA) techniques. RSSI fingerprint matching, trilateration, and triangulation techniques can be used with cellular and wireless access points that are configured to communicate with any of a variety of different communication standards and protocols, including GSM, CDMA, Wi-Fi, Bluetooth, Bluetooth Low Energy (BLE), LoRa, ZigBee, Z-wave, and RF.

In some examples, a tracking system 26 that includes a GSM/GPRS transceiver can scan GSM frequency bands for signals transmitted from one or more GSM cellular towers. For each signal received by the tracking system 26, the tracking system 26 can determine the signal strength and the identity of the cellular tower that transmitted the signal. The tracking system 26 can send the signal strength and transmitter identifier to the tracking service 64 to determine the location of the tracking system 26. If signal strength and transmitter identifier is available from only one cellular tower, the tracking service 64 can use nearest neighbor localization techniques to determine the location of the tracking system 26. If signal strength and transmitter identifier is received from two or more cellular towers, the tracking service 64 can use localization techniques, such as fingerprint matching, trilateration, and triangulation, to calculate the position of the tracking system 26.

In some examples, a tracking system 26 that includes a LoRa (Long Range) wireless communications wide area network transceiver can scan LoRa radio frequency bands for signals transmitted from one or more LoRa access points. For each signal received by the tracking system 26, the tracking system 26 can determine the signal strength and the identity of the access point that transmitted the signal. The tracking system 26 can send the signal strength and transmitter identifier information to the tracking service 64 to determine the location of the tracking system 26. If signal strength and transmitter identifier information is available from only one LoRa access point, the tracking service 64 can use nearest neighbor localization techniques to determine a location of the tracking system 26. If signal strength and transmitter identifier information is received from two or more LoRa access points, the tracking service 64 can use localization techniques, such as trilateration, and triangulation, to calculate the position of the tracking system 26. RSSI fingerprint matching also can be used to determine the location of the tracking system 26 in areas (e.g., indoor and outdoor locations, such as malls, warehouses, airports, and shipping ports) for which one or more radio maps have been generated.

The tracking service 64 includes one or more computing resources (e.g., server computers) that can be located in the same or different geographic locations. The tracking service 64 executes a locationing application 82 to determine the locations of the tracking system 26. In some examples, based on execution of the locationing application 82, the tracking service 64 receives location data from one or more of the tracking systems 26. In some examples, the tracking service 64 processes the data received from the tracking systems 26 to determine the physical locations of the tracking systems 26. For example, the tracking systems 26 may be configured to obtain locationing information from signals received from a satellite system (e.g., GPS, GLONASS, and NAVSTAR), cell towers and other wireless communication systems, or wireless communication access points, and send the locationing information to the tracking service 64 to ascertain the geographic locations of the tracking systems 26. In other examples, the tracking systems 26 are configured to ascertain their respective geographic locations from the signals received from a satellite system (e.g., GPS, GLONASS, and NAVSTAR), cell towers and other wireless communication systems, or wireless access points, and to transmit their respective geographic locations to the tracking service 64. In either or both cases, the tracking service 64 typically stores the locationing information and/or the determined geographic location for each tracking system in association with the respective unique identifier of the tracking system. The stored data may be used by the tracking service 64 to determine time, location, and state (e.g., sensor based) information about the tracking systems 64 and the objects or persons to which the tracking systems 64 are attached. Examples of such information include tracking the current location of a tracking system 26, determining the geographic route traveled by the tracking system 26 over time, and ascertaining stopover locations and durations.

Examples of the systems describe above can be implemented by one or more computers executing one or more computer programs to determine the path or route on a map-defined road network most likely navigated by a mobile target using path-based scoring based on position estimates obtained from different types of complementary locationing signal sources. In the process, the road network is represented by a directed graph to facilitate automated computer-based identification, scoring, and evaluation of different paths defined in a digital map representation of the road network.

Figure 4:
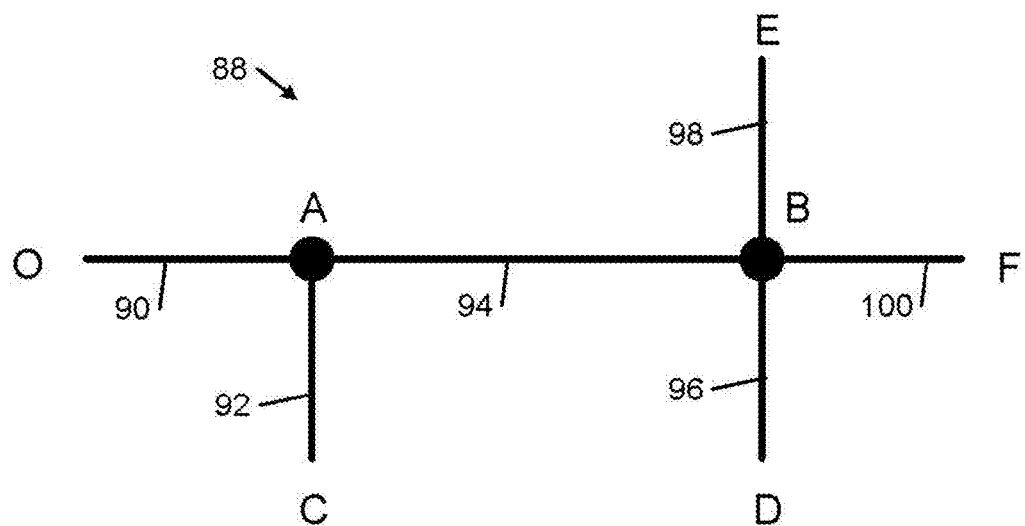
FIG. 4 is a directed graph representation of the road network of FIG. 1.

FIG. 4, for example, shows a directed graph representation 88 of the road network 12 shown in FIG. 1. In this representation, the road segment 14 defined between nodes O-A is represented by an edge 90, the road segment 20 defined between nodes A-C is represented by an edge 92, the road segment 16 defined between nodes A-B is represented by an edge 94, the road segment 22 defined between nodes B-D is represented by an edge 96, the road segment 24 defined between nodes B-E is represented by an edge 98, and the road segment 18 defined between nodes B-F is represented by an edge 100.

In some examples, the road network 12 is represented by geographic data in a geographic database. The geographic data may be stored in or otherwise carried by or on the mobile target 10, or it may be stored remotely and accessed by the mobile target 10 over, for example, a wireless communication network (e.g., network 62 shown in FIG. 3). In some examples, a mapping service manages and controls access to the geographic data in the geographic database. The mapping service and the above-mentioned tracking service 64 may be the same or different entities. In some examples, the mapping service may handle all processing of the data in geographic database and only make pertinent processed data available to the mobile target 10.

The geographic data may be encoded on one or more non-transitory computer-readable media in the form of computer-readable data files or databases. The geographic data typically includes information about roads and intersections in one or more geographic regions or coverage areas. Examples of such information include specification of road positions, and features related to the roads, such as restrictions on directions of travel, turn restrictions, and speed limits. The geographic information also can include information about points of interest, such as hotels, restaurants, and other commercial or government establishments.

The geographic database also includes information about roads. In some examples, roads are defined by a set of parameters that include nodes, edges (also referred to as links or segments), and edge shape (e.g., curvature). The geographic database typically includes at least one database entry for each road edge in the geographic region covered by the geographic database. Each road edge has two endpoints that terminate at respective nodes. The database entry for each road edge includes the respective geographic position of the endpoint nodes (e.g., geographic coordinates, such as longitude and latitude), a respective description of its features (e.g., an identifier and travel restriction information), and other information, such as the name of the street that includes the edge, the addresses associated with the edge, and the designated speed limits along the edge.

Particular embodiments can determine the path or route most likely navigated by a mobile target using path-based scoring based on position estimates obtained from different types of complementary (e.g., uncorrelated and/or independent) locationing signal sources. Instead of fusing the position data derived from the different types of sources, these example systems determine the most likely path navigated by the mobile target based on an aggregation of the position estimates derived from different source types. In this way, these systems can achieve enhanced locationing results without requiring complex processes for fusing the different locationing modalities.

Figure 5:
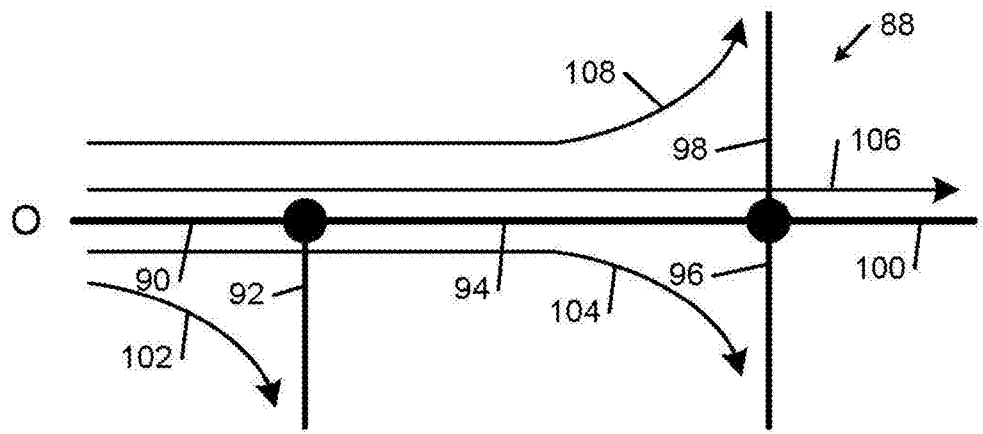
FIG. 5 shows four potential paths that can be defined for the road network of FIG. 4.

As shown in FIG. 5, the directed graph representation 88 of the road network 12 simplifies the process of identifying and specifying the potential paths through the road network 12. In this example, there are four potential paths 102, 104, 106, 108 through the directed graph 88. The first path 102 consists of the edges 90 and 92 and traverses nodes O-A-C, the second path 104 consists of edges 90, 94, 96 and traverses nodes O-A-B-D, the third path 106 consists of edges 90, 94, 100 and traverses nodes O-A-B-F, and the fourth path 108 consists of edges 90, 94, 98 and traverses nodes O-A-B-E. These paths 102-108 can readily be identified and evaluated using automated computer-based processing techniques.

In an example process, the path or route most likely navigated by a mobile target can be determined by scoring each path based on matching position estimates obtained from different types of complementary locationing signal sources to respective ones of the paths, and selecting the path having the best score (e.g., the smallest aggregate error). In some examples, the path scores are determined based on respective distances between the position estimates that are determined for the mobile target 10 and potential paths that can be generated from the edges that are defined the geographic database.

In some examples, the distance measure that is used to score the potential path is the Euclidean distance, which corresponds to the perpendicular distance from a given position estimate $(x_j, y_j)$ to a point on a potential path $(p_i)$. In the case of a potential path $p_i$ defined in a plane given by ax+by +c=0, where a, b, and c are real constants and both a and b are not zero, the perpendicular distance $d(p_i, (x_i, y_i))$ from the potential path $p_i$ to a given position estimate $(x_j, y_j)$ is given by equation (1):

$$d(p_i, (x_j, y_j)) = \frac{|ax_j + by_j + c|}{\sqrt{a^2 + b^2}} \quad (1)$$

The coordinates of the point on the potential path $p_i$ that is closest to the position estimate $(x_j, y_j)$ are given by equation (2):

$$x_i = \frac{b(bx_i - ay_i) - ac}{a^2 + b^2}, \quad y_i = \frac{a(-bx_i + ay_i) - bc}{a^2 + b^2} \quad (2)$$

In some examples, the score for each potential path $p_i$ is given by the least square error for the position estimates that are matched to the potential path $p_i$. That is, the score is given by equation (3), where n is the number of position estimates:

$$\text{score}(p_i) = \sqrt{[\sum_{j=1}^{n} (d(p_i, (x_j y_j))^2)]} \quad (3)$$

In some examples, the path $P_{MIN}$ that minimizes the score $(p_i)$ is selected as the most likely path navigated by the mobile target 10.

In this example locationing approach, the position estimates are processed in the same way regardless of the source type of the locationing signal from which position estimates were derived. Thus, this approach can achieve enhanced locationing results without requiring complex processes for fusing the different locationing modalities.

In some examples, the perpendicular distance $d(p_i, (x_i, y_i))$ from the path $p_i$ to a given position estimate $(x_j, y_j)$ is weighted by a respective locationing signal source or source type dependent weighting factor $w_k$, where the index k corresponds to a respective locationing signal source or source type (e.g., GPS, LoRa, IMU, etc.). In particular embodiments, the weight applied to the position estimates that are derived from GPS signals is higher than the weights applied to position estimates derived from other signal sources, such as LoRa and dead-reckoning signal sources. In some examples, the weights applied to position estimates derived from certain types of signal sources vary as a function of time. For instance, the weight applied to dead-reckoning position estimates can vary as a function of time. In particular embodiments, the dead-reckoning position estimate weight decreases according to an empirically determined function of time after each dead-reckoning location reset to GPS signal derived coordinates. In other examples, the dead-reckoning position estimate weight decreases according to an output of a trained machine learning classification system.

Figure 6A:
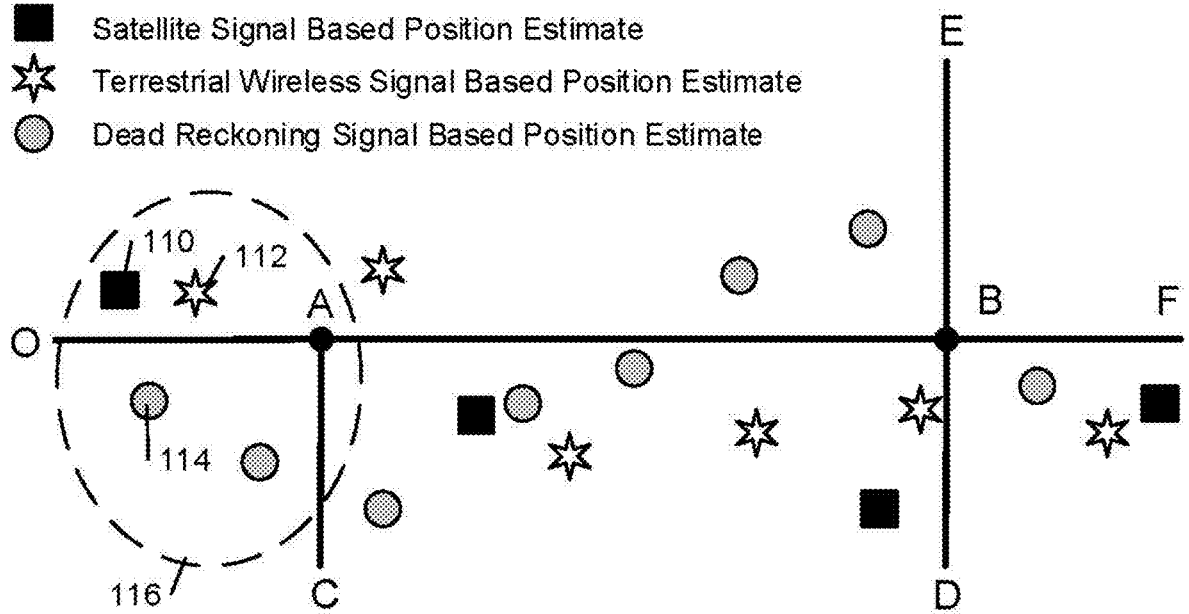
FIG. 6A is a diagrammatic view of estimated positions of a mobile target in relation to the graphical representation of the road network shown in FIG. 4.

FIG. 6A shows an exemplary collection of a plurality of position estimates derived from different types of complementary locationing signal sources superimposed on the graphical representation 88 of the spatial road network 12 defined in the geographic database. In the illustrated example, the different types of complementary locationing signal sources are satellite locationing signals 110 (e.g., GPS/GNSS), terrestrial wireless communication signals 112 (e.g., LoRa, GSM, GPRS, CDMA, Wi-Fi, etc.), and dead-reckoning signals 114 (e.g., speed and/or distance traveled, and heading changes).

Figure 6B:
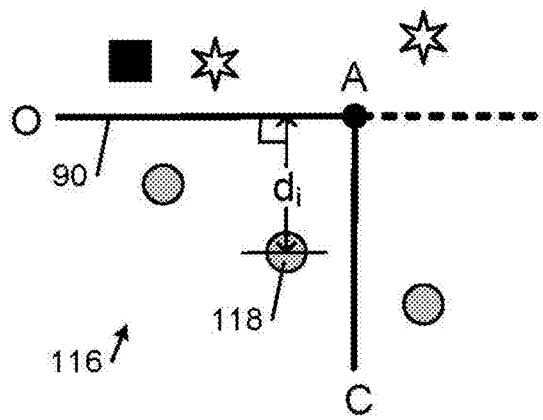
FIG. 6B is an enlarged diagrammatic view of the dashed elliptical region shown in FIG. 6A.

FIG. 6B shows a close-up view of the elliptical portion 116 of the geographic region depicted in FIG. 6A. In particular, FIG. 6B shows an example Euclidean distance $d_i$ between a dead-reckoning position estimate 118 and the edge 90.

Figure 7:
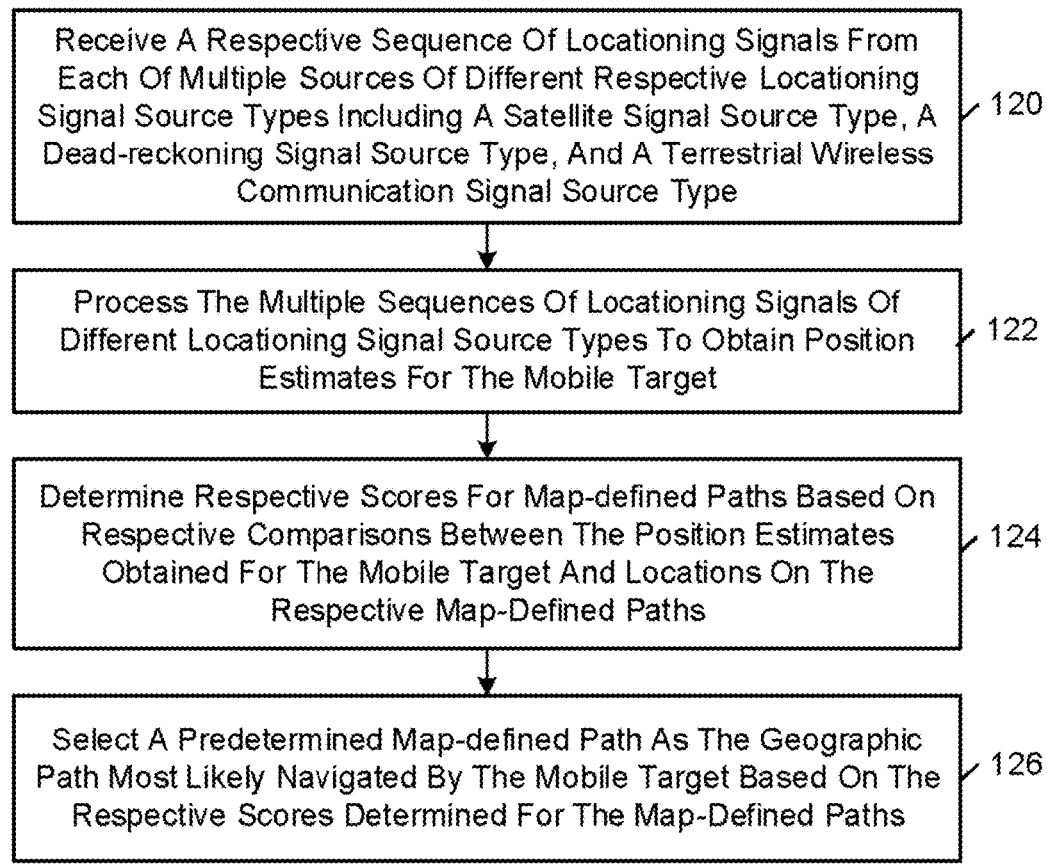
FIG. 7 is a flow diagram of an example process of identifying a geographic path most likely navigated by a mobile target.

FIG. 7 shows a flow diagram of an example method performed by one or more processors according to program instructions encoded on a non-transitory processor-readable medium to identify a geographic path navigated by a mobile target. In accordance with this method, a respective sequence of locationing signals is received from each of multiple sources of different respective locationing signal source types comprising a satellite signal source type, a dead-reckoning signal source type, and a terrestrial wireless communication signal source type (FIG. 7, block 120). The multiple sequences of locationing signals of different locationing signal source types are processed to obtain position estimates for the mobile target (FIG. 7, block 122). In particular embodiments, the sequences of locationing signals are processed into respective sequences of position estimates. Respective scores are determined for map-defined paths based on respective comparisons between the position estimates obtained for the mobile target and locations on the respective map-defined paths (FIG. 7, block 124). A map-defined path is selected as the geographic path most likely navigated by the mobile target based on the respective scores determined for the map-defined paths (FIG. 7, block 126).

In particular embodiments, the tracking system 26 receives a respective sequence of locationing signals from each of multiple sources of different respective locationing signal source types. At least one of the tracking system 26 and the tracking service 64 participates in processing the multiple sequences of locationing signals of different locationing signal source types to obtain position estimates for the mobile target, the determining of respective scores for the map-defined paths, and the selecting of the most likely path navigated by the mobile target.

In particular embodiments, a respective sequence of locationing signals is received from each of a satellite signal source type, a dead-reckoning signal source type, and a terrestrial wireless communication signal source type.

In particular embodiments, the respective scores are determined based on respective distances between the position estimates obtained for the mobile target and locations on the respective map-defined paths. In some examples, the respective distances are Euclidean distances. In some examples, the determination of the respective scores comprises squaring the respective distances and summing the respective squared distances for each map-defined path, and the selecting comprises selecting the map-defined path with a lowest respective score. In some examples, the respective scores for the map-defined paths are determined based on weighting ones of the distances with respective weights associated with the sources of the received sequences of locationing signals.

Particular embodiments perform operations comprising filtering out ones of the map-defined paths that fail to satisfy one or more limits relating to movement of the mobile target and/or restrictions defined in the geographic database for the respective segments of the map-defined paths. The one or more limits can include, for example, one or more of a maximum speed of the mobile target and a maximum acceleration of the mobile target.

In particular embodiments, the receiving, the processing, the determining, and the selecting are performed cyclically over respective intervals. In some examples, the respective intervals overlap. In some examples, the processing comprises, iteratively identifying respective current sets of the position estimates for the mobile target in a window over respective intervals; and, for each interval, determining respective scores for the map-defined paths, and selecting the most likely map-defined path. In some examples, in a subsequent interval, at least a portion of the map-defined path selected in a preceding interval is replaced with a respective portion of a different map-defined path that has a better score in the subsequent interval than the map-defined path selected in a preceding interval.

Figure 8:
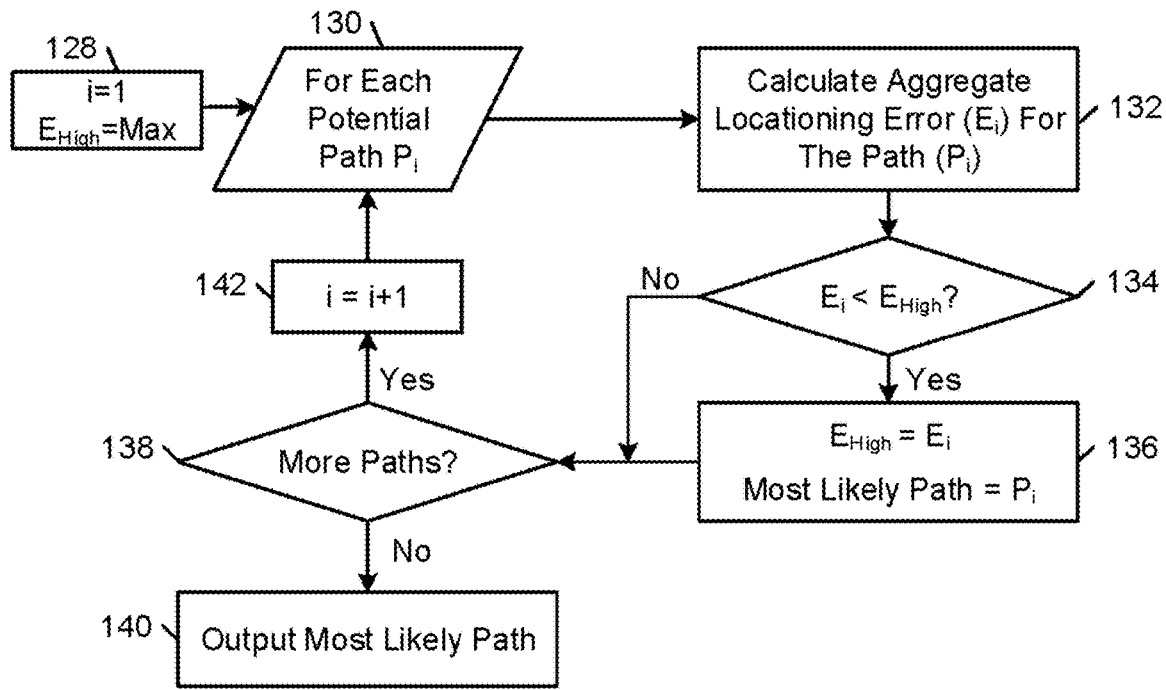
FIG. 8 is a flow diagram of an example process of identifying a geographic path most likely navigated by a mobile target.

FIG. 8 shows a flow diagram of an example method performed by one or more processors executing one or more processor instructions encoded on a processor-readable medium to identify a geographic path navigated by a mobile target. In accordance with this method, an index value i is initialized to 1 and the threshold error $E_{High}$ is initialized to a high maximum number (i.e., Max) (FIG. 8, block 128). For each potential path $P_i$ (FIG. 8, block 130), an aggregate locationing error ($E_i$) is calculated for the potential path $P_i$ (FIG. 8, block 132). If the current aggregate locationing error ($E_i$) is less than $E_{High}$ (FIG. 8, block 134), the value of $E_{High}$ is set to the value of the current aggregate locationing error ($E_i$) and the Most Likely Path is set to the current path ($P_i$) (FIG. 8, block 136); otherwise the process proceeds to the next step (FIG. 8, block 138). In the first iteration (i.e., when the index i=1), all values of $E_i$ are less than Max. If there are no more paths to process (FIG. 8, block 138), the current Most Likely Path is outputted (FIG. 8, block 140). If there are any more paths remaining to be processed (FIG. 8, block 138), the current index value i is incremented (FIG. 8, block 142), and the process is repeated for the new current potential path ($P_i$) (FIG. 8, block 130).

As explained above, in some examples, a window extends from the present over an interval into the past to identify respective sets of position estimates for a mobile target over respective intervals. The position estimates are determined from complementary locationing signal sources (e.g., sources of different signal types with respective locationing reliabilities or accuracies that generally are independent of or uncorrelated). In some examples, the signal sources are selected from satellite signal sources, dead-reckoning signal sources, and terrestrial wireless communication signal sources. For each interval, the respective set of position estimates is used to score respective paths (e.g., sequences of connected road segments) that are defined in a predetermined map of a road network, and the path most likely to have been navigated by the mobile target is determined based on the path scores. The window typically identifies an interval of position estimates that covers enough of the spatial path structures and segment interconnections of the road network that isolated or localized path selection errors can be corrected over one or more future intervals without having to re-evaluate past intervals that are outside the current interval and without having to identify and track restricted sets of potential paths over time.

FIGS. 9A-9D show an example window 150 that extends over different spatial mappings of estimated position data to identify respective overlapping sets of position estimates for iteratively selecting the most likely path traversed by the mobile target 10 over respective intervals.

Figure 9A:
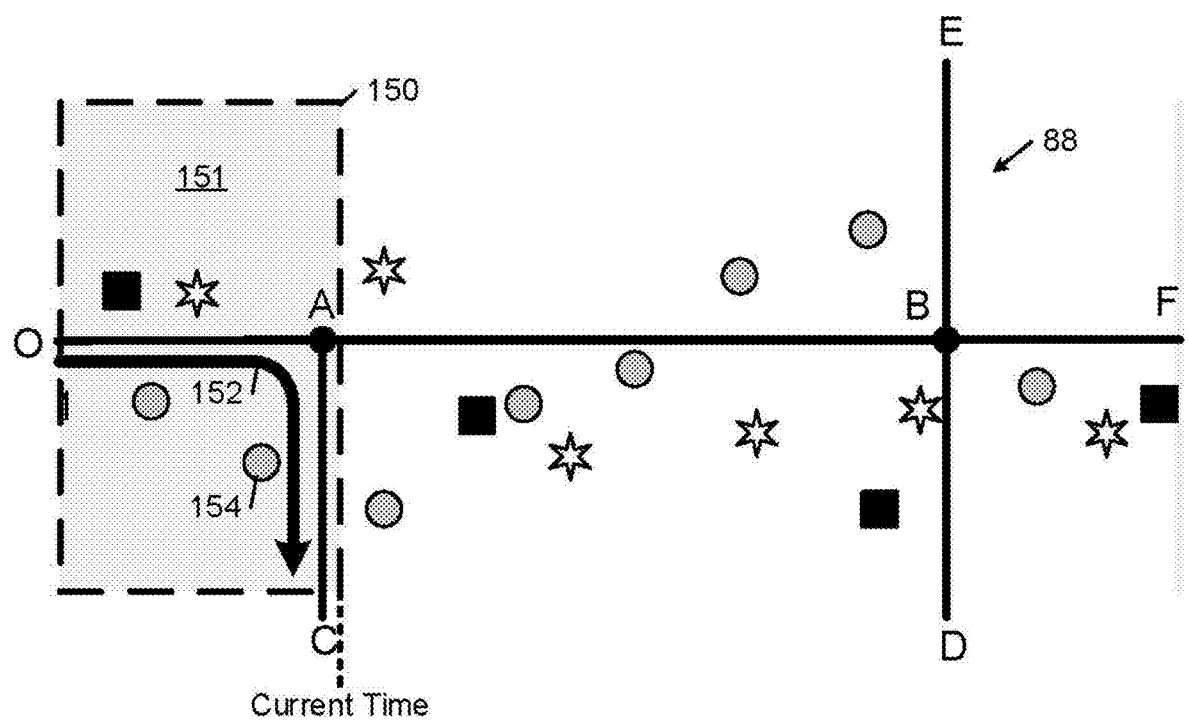
FIGS. 9A-9D show a window identifying respective sets of position estimates for a mobile target over different intervals superimposed on a spatial representation of a road network.

FIG. 9A shows the window 150 superimposed over a first subset 151 of the position estimates in directed graph representation 88 of the road network 12 shown in FIG. 6A. The position estimates within the window 150 are used to determine the path most likely navigated by the mobile target 10 for the current interval. In the example shown in FIG. 9A, based on the respective distances between the position estimates within the window 150 and the potential paths O-A and O-A-C, the system selected the path 152 corresponding to path O-A-C primarily because of the spatial location of the position estimate 154.

Figure 9B:
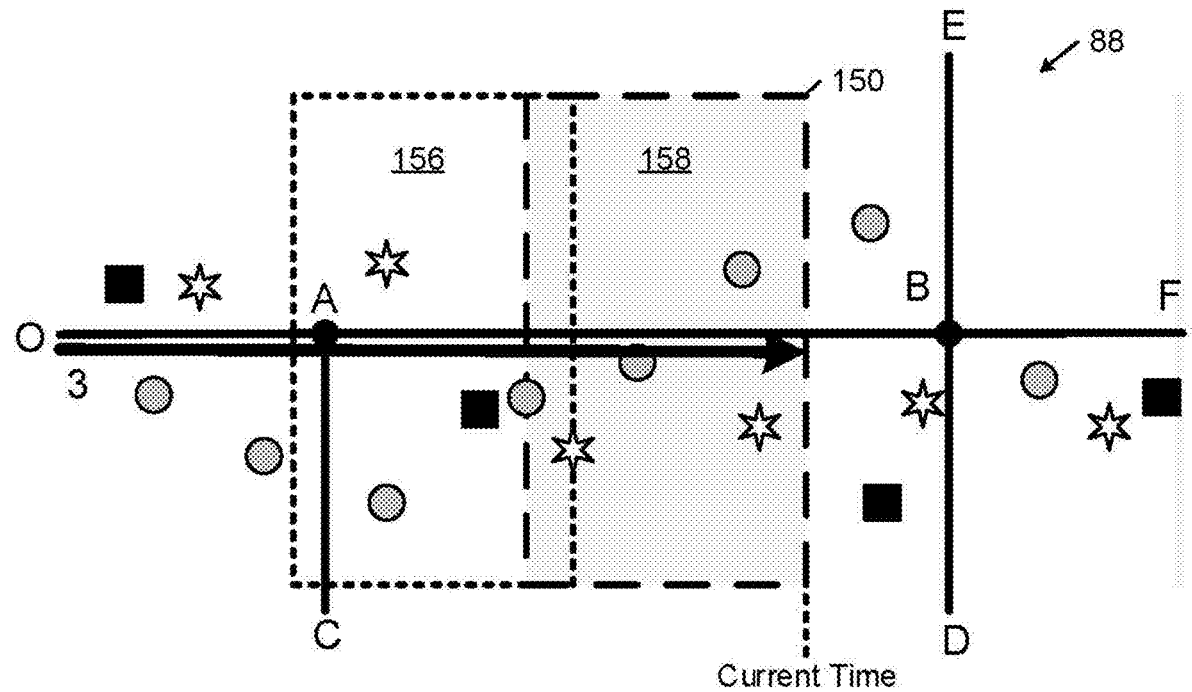

FIG. 9B shows the window 150 after two successive iterations during which time the window 150 defined a second subset 156 of estimated position data and a third subset 158 of estimated position data. In this example, as the mobile target traversed the edge A-B, the second subset 156 of estimated position data shifted back toward the edge A-B; as a result, upon re-scoring the set of potential paths, the system dropped the selected path 152 (i.e., O-A-C) and replaced it with the path O-A-B. Thus, by re-evaluating portions of previously selected paths based on current locationing estimates, the window path selection approach enables current data to be used to correct past path selection mistakes. The third subset 158 of estimated position data defined by the window 150 in its current position is consistent with the previously selected path OAB.

Figure 9C:
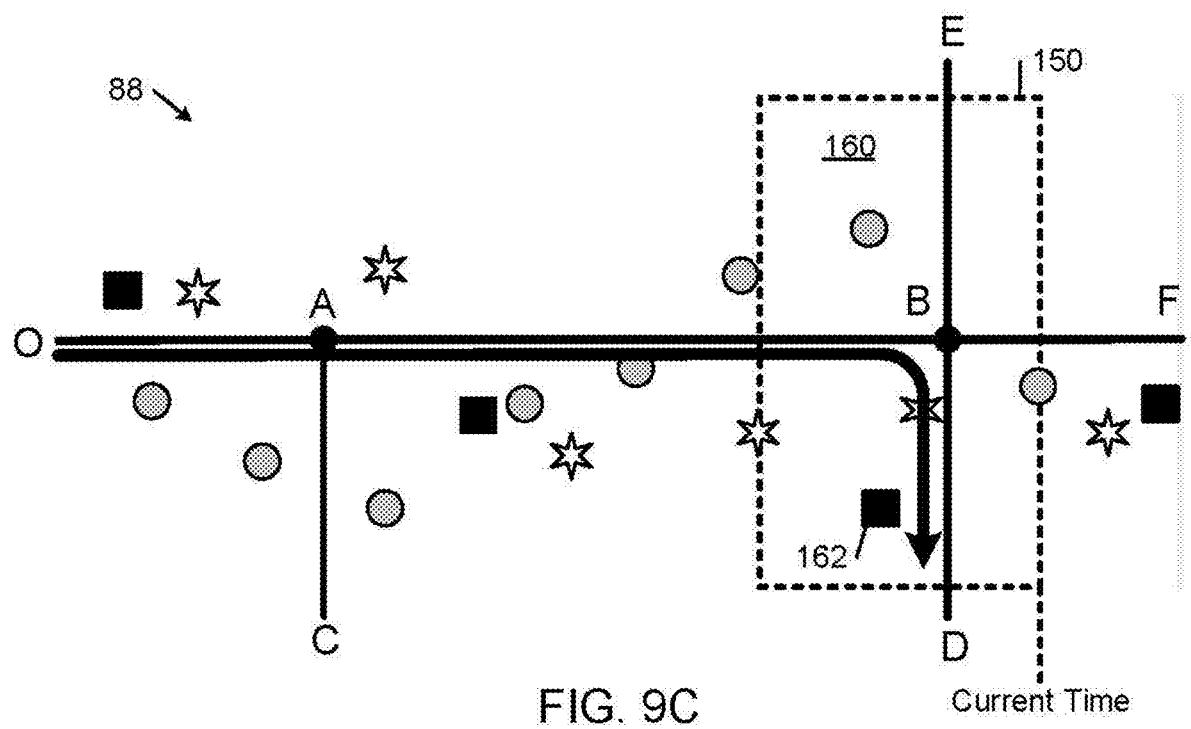

FIG. 9C shows the window 150 after a fourth iteration. In its current position, the window 150 defines a fourth subset 160 of estimated position data. In the example shown in FIG. 9C, based on respective distances between the position estimates within the window 150 and the potential paths O-A-B-F, O-A-B-D, and O-A-B-E, the system selected the path O-A-B-D primarily because of the spatial location of the position estimate 164, which is derived from signals sourced from a satellite (e.g., a GPS satellite) and therefore weighted more heavily in this example.

Figure 9D:
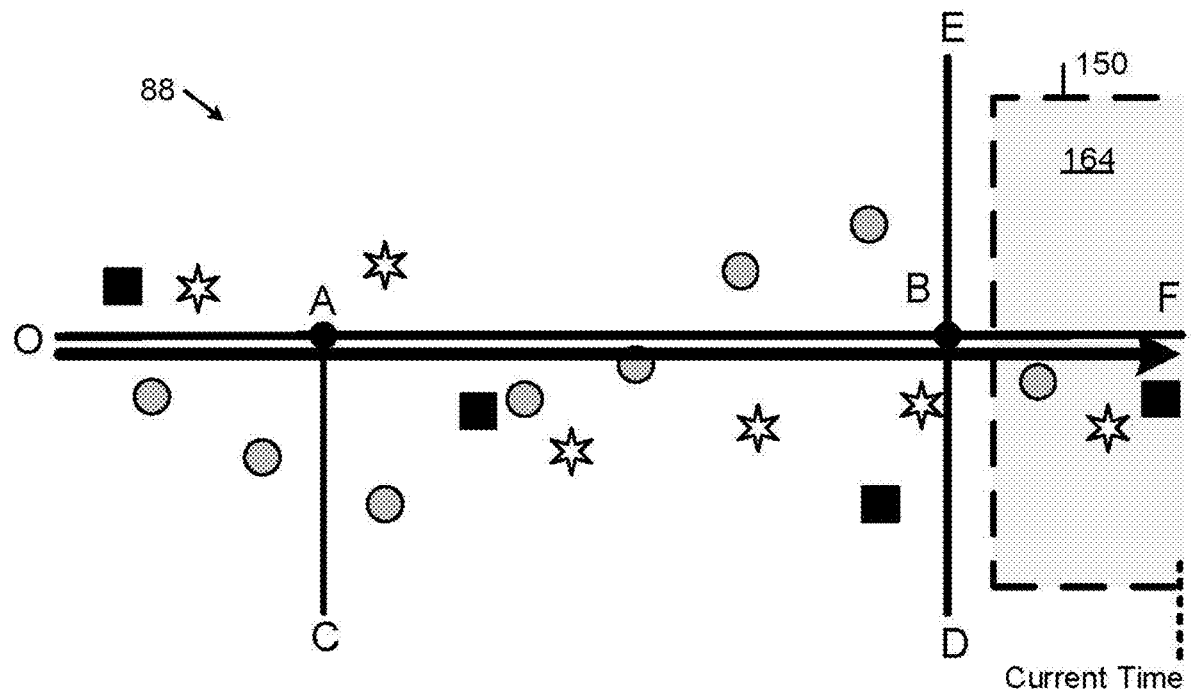

FIG. 9D shows the window 150 after a fifth iteration. In its current position, the window 150 defines a fifth subset 164 of estimated position data. The fifth subset 164 of estimated position data shifted back toward the edge B-F and, as a result, upon re-scoring the set of potential paths, the system replaced the selected path O-A-B-D with the path O-A-B-F.

In particular embodiments, a less computationally intensive process is used to identify a geographic path navigated by a mobile target. Instead of computing scores for the map-defined paths for each interval based on the aggregate locationing error between the position estimates and the map-defined paths, the process shown in FIG. 10 identifies edges of geographic paths defined in a geographic database based on associations or mappings between the position estimates and the segments.

Figure 10:
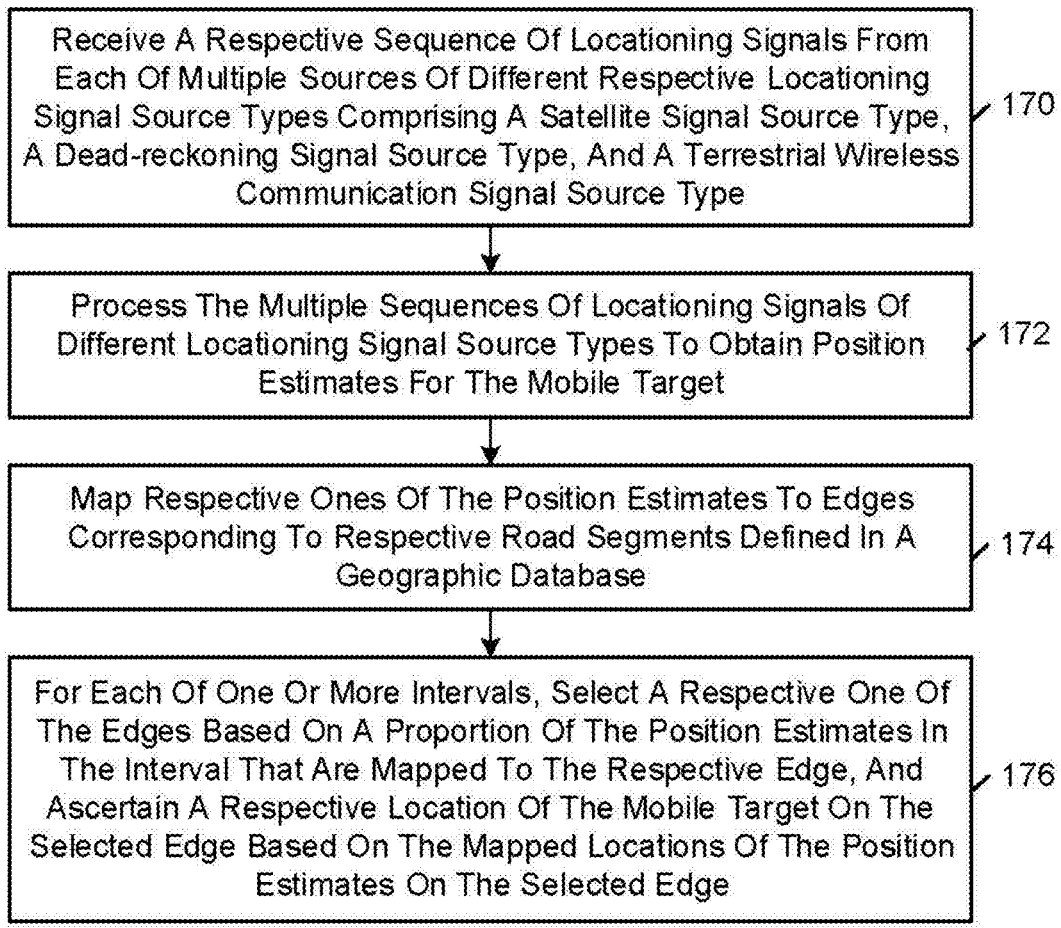
FIG. 10 is a flow diagram of an example process of determining a geographic path most likely navigated by a mobile target.

FIG. 10 shows a flow diagram of an example method performed by one or more processors according to program instructions encoded on a non-transitory processor-readable structure to identify a geographic path navigated by a mobile target. In accordance with this method, a respective sequence of locationing signals is received from each of multiple sources of different respective locationing signal source types comprising a satellite signal source type, a dead-reckoning signal source type, and a terrestrial wireless communication signal source type (FIG. 7, block 170). The multiple sequences of locationing signals of different locationing signal source types are processed to obtain position estimates for the mobile target (FIG. 7, block 172). Respective ones of the position estimates are mapped to edges that correspond to respective road segments that are defined in a geographic database (FIG. 7, block 174). For each of one or more intervals, a respective one of the edges is selected based on a proportion of the position estimates in the interval that are mapped to the respective edge, and a respective location of the mobile target on the selected edge is ascertained based on the mapped locations of the position estimates on the selected edge (FIG. 7, block 176).

In particular embodiments, the mapping of the position estimates to the edges includes mapping each of the respective position estimates to a closest one of the edges. In some examples, the Euclidian distance is used to determine the closest ones of the edges.

In particular embodiments, the respective edge is selected based on a determination that a largest proportion of the position estimates in the interval are mapped to the respective edge. In some examples, the respective edge is selected based on a determination that a majority of the position estimates in the interval are mapped to the respective edge.

In particular embodiments, the process includes, for each of the one or more intervals, filtering out ones of the position estimates that are mapped to the respective edge and are determined to be out-of-sequence based on time information associated with the respective position estimates.

Figure 11A:
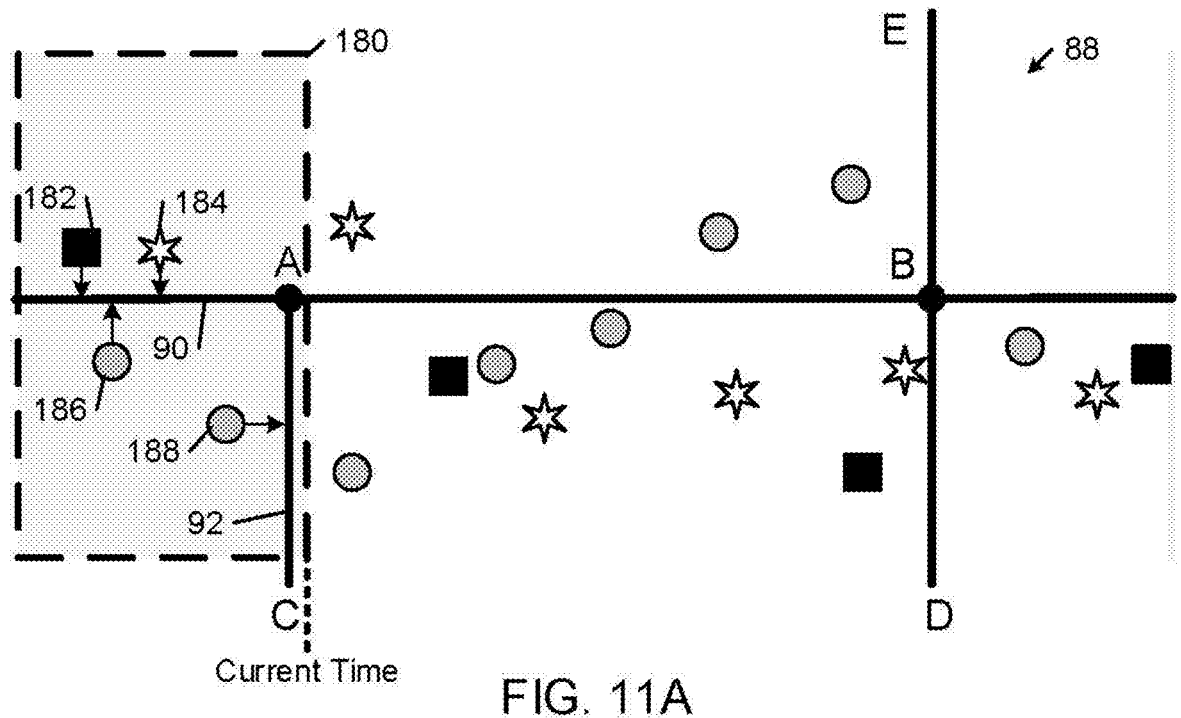
FIG. 11A shows a window over position estimates superimposed on a spatial representation of a road network.

FIG. 11A shows a window 180 over position estimates superimposed on the directed graph representation 88 of the road network 12. In accordance with the process of FIG. 10, the position estimates 182, 184, 186, 188 in the window 180 are to be transposed or mapped to respective edges of the graphical representation 88 of the road network 12. In some examples, each of the respective position estimates is transposed to a closest one of the edges of the graphical representation. In particular embodiments, the distance between a given position estimate and an edge is given by the Euclidean distance, which measures the perpendicular distance between a point and a line. In this regard, the position estimates 182, 184, and 186 are to be mapped to the edge 90 and the position estimate 188 is to be mapped to the edge 92.

Figure 11B:
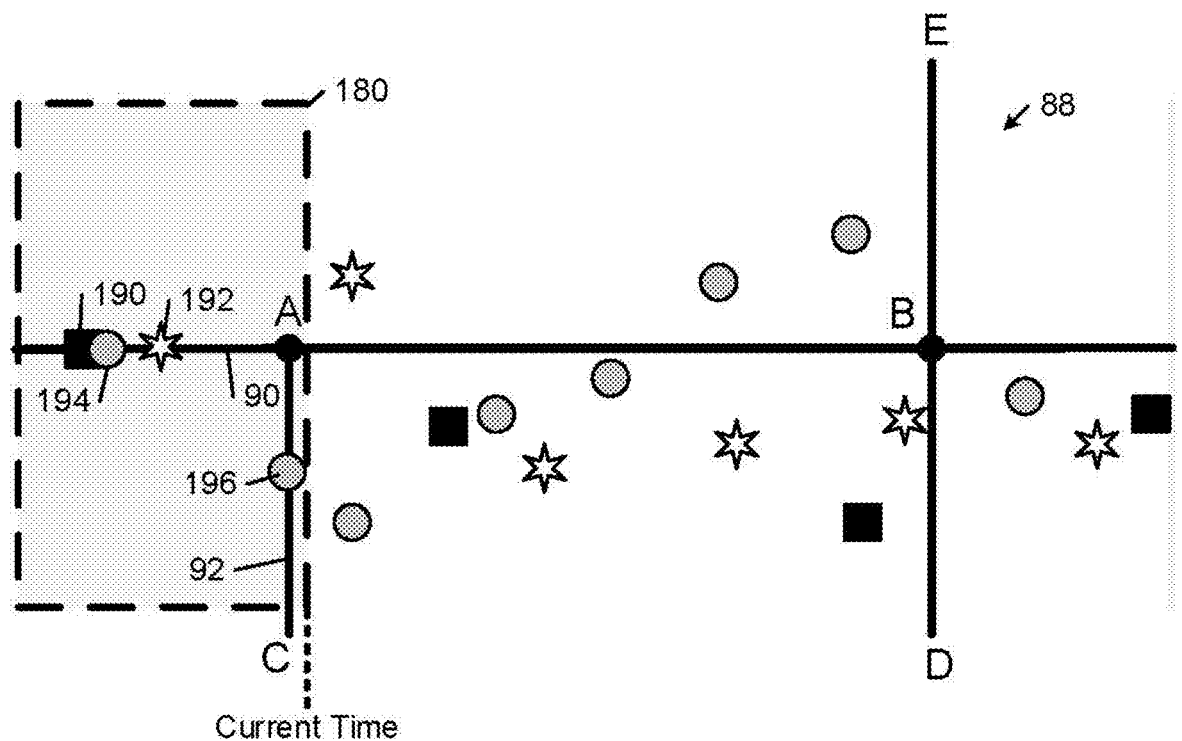
FIG. 11B depicts the spatial representation of the road network shown in FIG. 11A with the position estimates in the window transposed to edges of the road network that are closest to their respective positions.

FIG. 11B shows the directed graph representation 88 of the road network 12 with the position estimates in the window 180 transposed to the edges 90, 92 that are closest to their respective positions. As shown in FIG. 11B, the position estimates 182, 184, 186 have been transposed to the edge 90, and the position estimate 188 has been transposed to the edge 92. The coordinate locations of the transposed position estimates 190, 192, 194, 196 are given by equation (2) above.

Figure 11C:
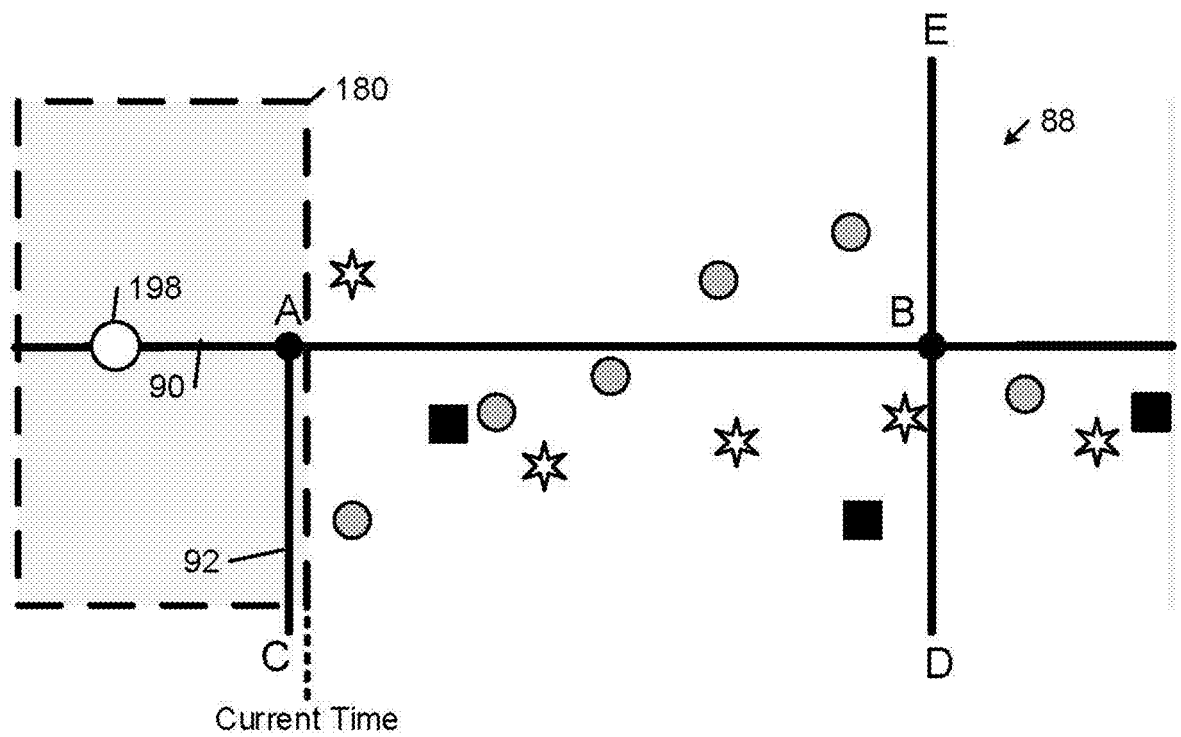
FIG. 11C shows the spatial representation of the road network shown in FIG. 11B in which the transposed position estimates in the window have been replaced by a single position on an edge of the road network.

FIG. 11C shows the directed graph representation 88 of the road network 12 in which the transposed position estimates in the window shown in FIG. 11B have been replaced by a representative position estimate 198 on an edge of the directed graph representation 88 the road network 12. In some examples, the position of the representative position estimate 198 is the average of the positions of the transposed position estimates 190, 192, 194, 196. In some examples, the position of the representative position estimate 198 corresponds to the weighted average of the positions of the transposed position estimates 190, 192, 194, 196, where the weights correspond to the respective locationing signal source or source type dependent weighting factors $w_k$ described above.

Figure 12A:
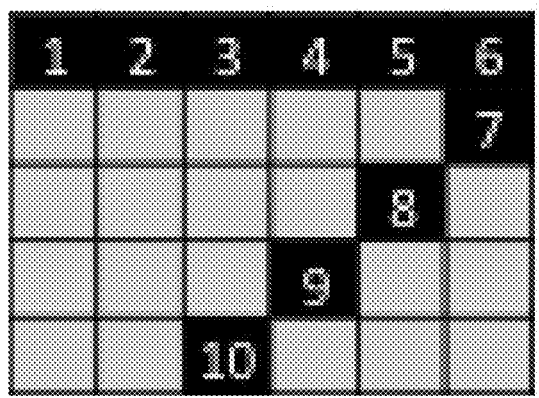
FIG. 12A shows a geographical map that shows an example path.
Figure 12B:
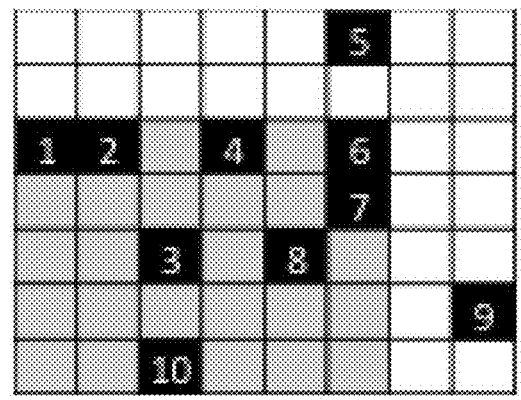
FIG. 12B shows the actual measurement due to systematic interferences.
Figure 12C:
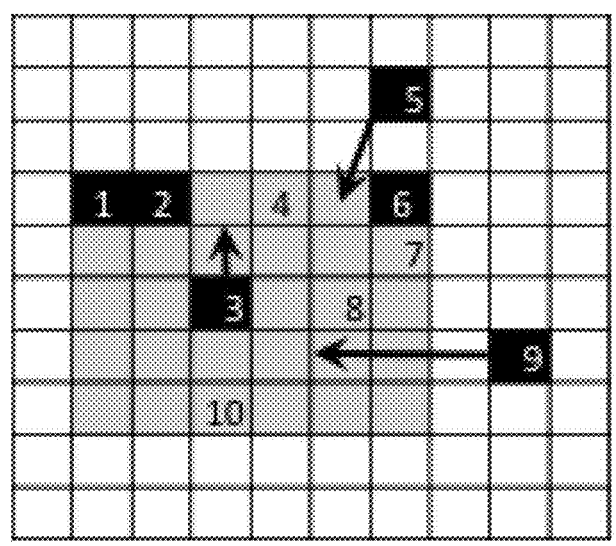
FIG. 12C shows the constructed reference table based on training the system systematic interferences.
Figure 12D:
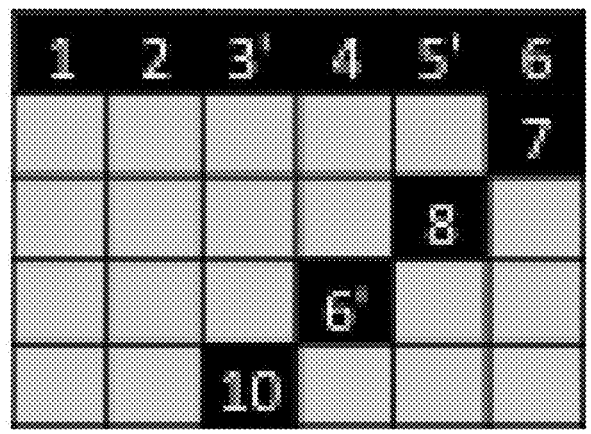
FIG. 12D shows the resulting measured path after using the reference table.

FIG. 12A shows an example path after above analysis. During a training phase various paths are repeated. If certain locations are off in a statistically significant fashion then this is due to systematic interferences. Measurement of ground truth can happen using a more expensive approach that you would not use during normal operation to reduce the cost of the target. FIG. 12C shows the construction of a reference table during the training phase. During actual operations, outliers can be identified due to known or estimated actual speed or maximum speed of the vehicle as well as sensitivity to systematic errors. If any of the potential references in the look up table point to a point that meets the requirements given the actual or estimated speed (or maximum speed), then the estimate is replaced with the reference. To remove or minimize stochastic noise, all the experiments outline above will be repeated a number of time. The number of times can be modulated to desired battery life.

Figure 13:
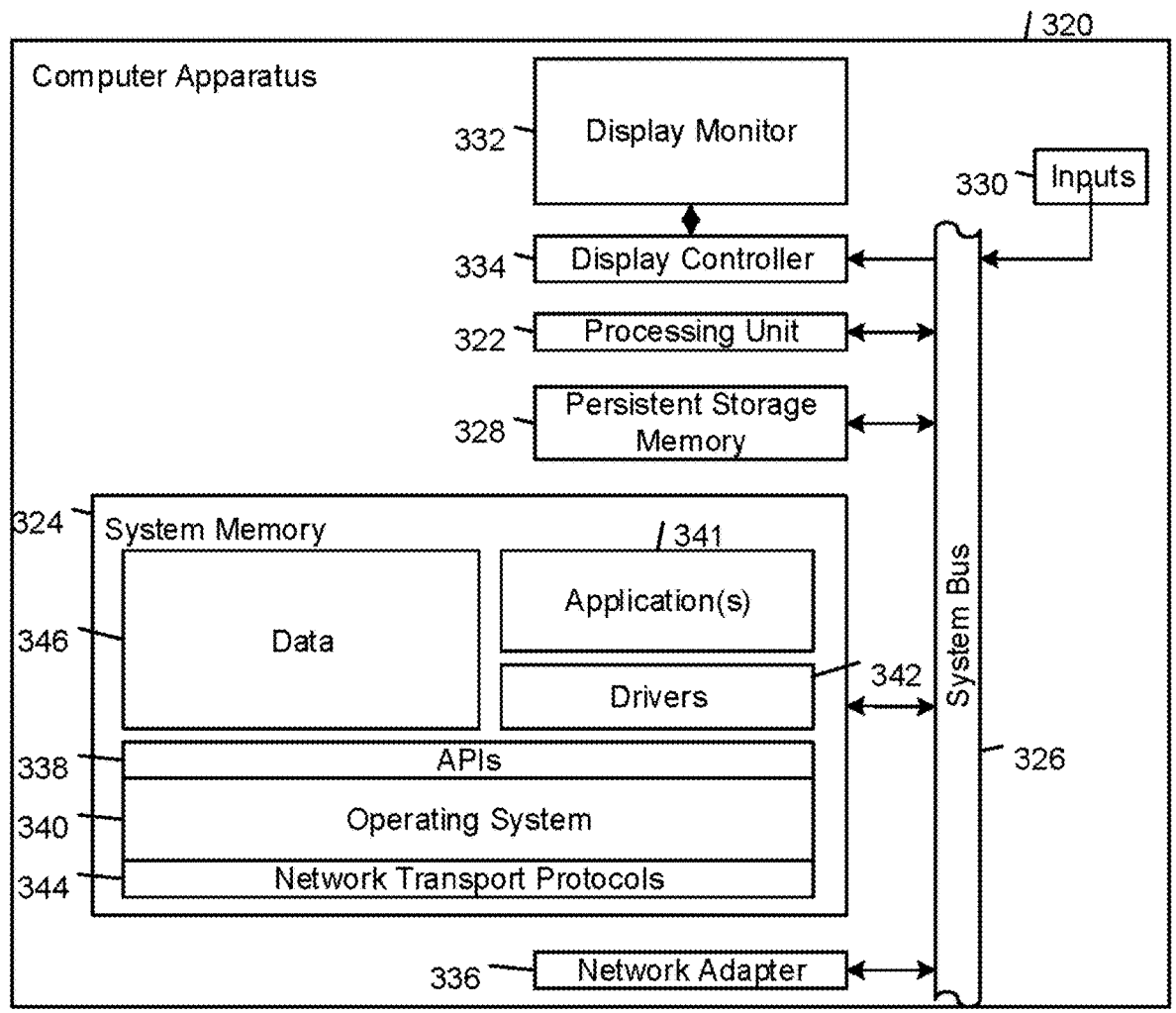
FIG. 13 is a block diagram of an example computer apparatus.

FIG. 13 shows an example embodiment of computer apparatus that, either alone or in combination with one or more other computing apparatus, is operable to implement one or more of the computer systems described in this specification, including one or more of the tracking service system 64, the network system 62, and the client system 68.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Supplemental Disclosure

Particular embodiments of the tracking system (referred to herein as Smart Tape) have an adhesive tape form factor that makes the product also function as a tape to close items. The new form factor is optimized for flexibility and not dimensions. In fact, the tape can cover a much larger surface area, which can be used for antennas or batteries or other flexible or rigid technologies. Particular embodiments include architectures to optimize tracking applications leveraging the internet-of-things (IOT) devices and sensor technologies. In particular embodiments:

Smart Tape is a flexible functional tape with tracking capabilities.

Smart Tape operates bi-directionally and can also generate signals thereby complementing traditional tracking.

Smart Tape can use a proprietary network designed for the specific application of tracking freight, shipping & logistics Smart Tape has a price point that makes it a disposable item enabling new use cases and reducing the cost of any reverse logistics.

Smart Tape form factor allows more surface area in the tracking system to provide larger batteries and additional components to improve system features, performance and to enable customization.

Implementation:

Particular embodiments use flexible components (e.g., flexible batteries, printable electronics, and flexible antennas) and combines them with advances in flexible manufacturing processes to create a tracking system that is flexible and non-intrusive to cargo space and offers the benefits mentioned above.

Figure 14:
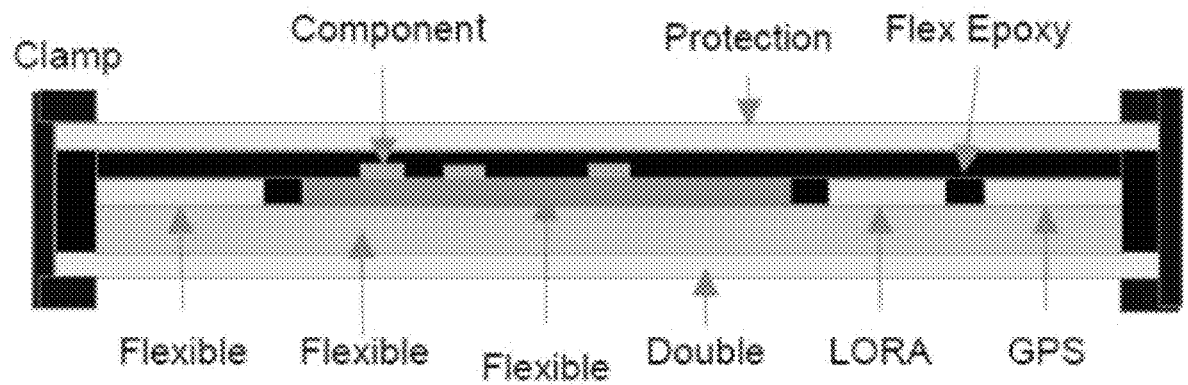
FIG. 14 is a cross-sectional view of an example tracking system.

FIG. 14 shows an example of a cross-section of Smart Tape. This is just an example and is does not limit the scope of the particular embodiments in terms additional component or materials. In addition, Smart Tape can also be a hybrid combination of rigid a flexible component.

Figure 15:
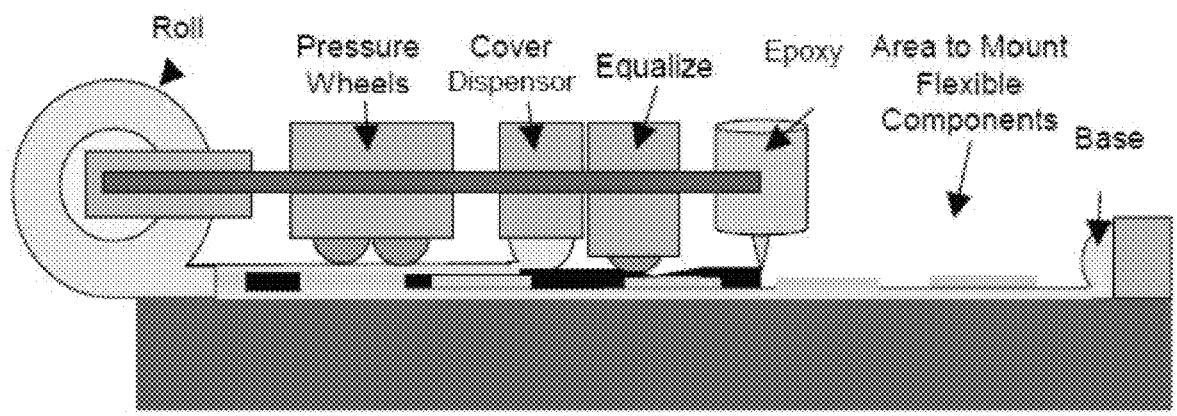
FIG. 15 is a diagrammatic side view of an example system for fabricating the example tracking system shown in FIG. 13.

Particular embodiments can be manufactured using a proprietary process to create electronic systems on a tape. A representative picture is shown in FIG. 15.

Figure 16:
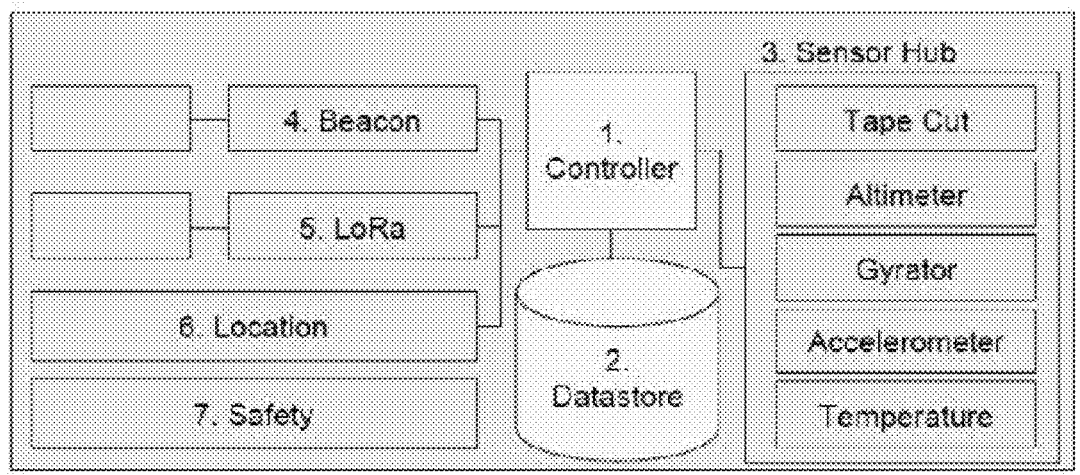
FIG. 16 is a block diagram of an example tracking system.

Smart Tape Hardware Architecture:

FIG. 16 shows a representative architecture for the electronic hardware of a Smart Tape. The controller represents the brains of the system. The data store is used to store measurements during normal operation of the Smart Tape. The sensor hub includes various sensors to perform the functionality of the Smart Tape such as tape cut sensor (to identify when the system should be turned on), altimeter (to turn off the system in air), gyrators and accelerometer (to measure quality of shipment) as well as the temperature (to log temperatures). The measured data can be stored in database (2) at the proper frequency). The beacon system (4) can send out a pulse so that an operator can identify Smart Tape at a higher accuracy using a direct point-to-point connection to a smart phone assisted by the cloud triangulation thru hubs. The LORA system (5) is used to communicate. The location system (6) integrates all available information to develop a better understanding of the location of the Smart Tape. To perform this function, the system is integrated with cloud aspects and the hubs explained in the next sections. The safety/security engine (7) performs functions that include monitoring the state of the tape for tampering, and encrypting data.

Figure 17:
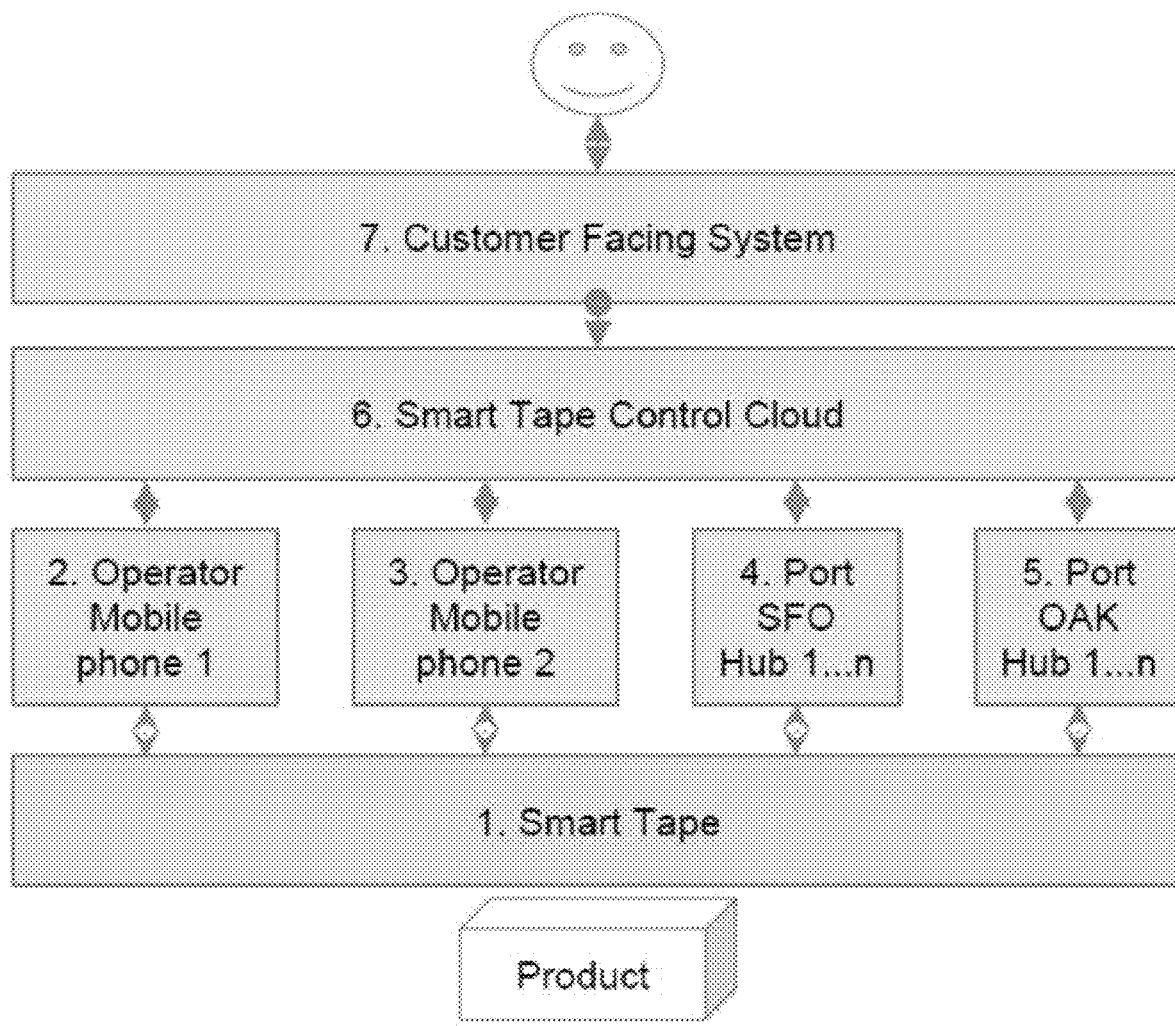
FIG. 17 is a block diagram of an example network architecture.

Smart Tape Tracking System Architecture:

FIG. 17 shows an architecture of a tracking system using Smart Tape and describes how Smart Tape can be interfaced with the enterprise IT systems to use the locationing information in a business intelligence system to provide monitoring, optimization and security services to businesses. This type of system can be deployed by the end customer or a services provider that can monetize the services.

In particular embodiments, the Smart Tape is connected wirelessly through mobile phones of the operator (2) or (3)

but also to clusters of hubs (4) and (5). Block (2) represents the mobile phone of an operator. The operator can initialize and authenticate the Smart Tape by sensing a unique identifier to the Smart Tape cloud (6). Optionally also images of a box that is being tracked can be associated with unique tracking identifiers. The operator can also monitor the status of a Smart Tape.

Block (3) represents the mobile phone of another operator with potentially similar capabilities as (2). Block (3) represents a number of strategically places hubs around a tracked region (TR) to help triangulate the location but also to potentially communicate to the cloud (6) without assistance of mobile phone (2) or (3). Block (4) represents another tracked region thru strategically placed hubs (similar as 3).

The Smart Tape control cloud (6) is the master in the master and slave model. The architecture is a spoke and hub model where the cloud is the hub. The customer facing cloud (7) can be operated by other entities. The interface between the Smart Tape control cloud (6) and the customer facing cloud (7) is a simple API.

The architectures described above merely present example instantiations. The actual user experience of the above-described system consists of various steps that can be broken in three important phases: (1) installing tracking regions, (2) installing operator hubs and (3) operating the system on a day-to-day basis:

Installing Tracking Region (TR):
The process of installing the tracking region includes:

| Item | Name | Description |
| --- | --- | --- |
| 1 | Computer aided region roll out | Identify the customer requirements (geo-fencing or detailed tracking) Identify number of nodes Identify type of nodes |
| 2 | Calibration system | Measure effectiveness at various points Gather data that help the system compensate for dynamic or static interferences |
| 3 | Test system | Test performance of the system |

Installing Operator Region (OR):
The process of installing the operator region includes:

| Item | Name | Description |
| --- | --- | --- |
| 1 | Buy the tape | Buy Smart Tape. No need to turn the tape on. |
| 2 | Setup operator app & phone | Give operator smart phone with app that enables making photos of boxes. |
| 3 | Test system | Performance a test of the operator system |

Operator Use Model:
The operator use model includes:

| Item | Name | Description |
| --- | --- | --- |
| 1 | Deploy tape | Get the tape, cut it (which turns on the tape automatically), and use it to for example close a box |
| 2 | Authenticate | Use the phone to authenticate and initiate the tape (optionally make a photo of the box that from then on get associated with the system. |
| 3 | Monitor | Tape monitors locations as well as various sensor modalities |
| 4 | Operator Region | Communicate measurements to the cloud |
| 5 | Tracked Region | Communicate measurements to the cloud |

Location Software Architecture:
Particular embodiments cover both techniques based on using time as well as amplitude. The approach works in both centralized localization as well as distributed localization. Particular localization embodiments include:

Beacon-based distributed algorithms: Beacon-based distributed algorithms start with some group of beacons and nodes in the network to obtain a distance measurement to a few beacons, and then use these measurements to determine their own location.

Relaxation-based distributed algorithms: In relaxation-based distributed algorithms use a coarse algorithm to roughly localize nodes in the network. This coarse algorithm is followed by a refinement step, which typically involves each node adjusting its position to approximate the optimal solution.

Coordinate system stitching based distributed algorithms: In Coordinate system stitching the network is divided into small overlapping sub-regions, each of which creates an optimal local map. Next the scheme merges the local maps into a single global map.

Hybrid localization algorithms: Hybrid localization schemes use two different localization techniques such as: multidimensional scaling (MDS) and proximity based map (PDM) or MDS and Ad-hoc Positioning System (APS) to reduce communication and computation cost.

Interferometric ranging based localization: Radio interferometric positioning exploits interfering radio waves emitted from two locations at slightly different frequencies to obtain the necessary ranging information for localization.

Error propagation aware localization: When sensors communicate with each other, error propagation can be caused due to the undesirable wireless environment, such as channel fading and noise corruption.

Particular embodiments focus on creating an explicit model of non-idealities of the environment. The machine learning algorithms are deployed to learn the model and thereby improve accuracy of localization. The learning can happen during run-time or during a separate learning phase. Modern machine learning algorithms are deployed to establish and refine the system. The dataset used for learning can be based on (1) feedback on incorrect localization efforts, (2) sampling routes using calibration systems with other navigation approaches, (3) combining data from multiple Smart Tapes to accelerate the development of the model, (4) using maps to explicitly evaluate direct line of sight.

The following equation describes the estimation process:

$$(x_{estimator}, y_{estimator}, z_{estimator}) = f_{model}(x,y,z,a,b,c,d,e,f)$$

Parameters can include temperature, time-of-day, geographical maps, etc. An example error function is given by:

$$\text{Error Function} = |f_{model}(x,y,z,a,b,c,d,e,f) - (x_{actual}, y_{actual}, z_{actual})|$$

The model can include an amplification factor or reflection factor that is a function of the (x,y,z) coordinates. Moreover, the error function can be established thru multiple Smart Tape measurements in time or space.

Subsequently supervised learning can be deployed to analyze target/outcome variable (or dependent variable) which is to be predicted from a given set of predictors (independent variables). Using these sets of variables, we generate a function that maps inputs to desired outputs. The training process continues until the model achieves a desired level of accuracy on the training data. This can be established by regression, decision trees, random forests, KNN, or Logistic Regression.

We also can improve location accuracy using unsupervised learning. We do not have any target or outcome variable to predict/estimate. It is used for clustering population in different groups, which is also widely used for segmenting customers in different groups for specific intervention. We can use an a priori algorithm or K-means. This approach will also enable pinpointing weaknesses of the current physical architecture.

We can also use reinforced learning. The machine is trained to make specific decisions. It works this way: the machine is exposed to an environment where it trains itself continually using trial and error. This machine learns from past experience and tries to capture the best possible knowledge to make accurate business decisions. Example of Reinforcement Learning: Markov Decision Process.

Particular Embodiments

Particular embodiments include the following features:

A tracking System with flexible form factor enabling multiple uses (e.g., clothes, tape, tag). The use of flexible batteries or energy harvesting techniques to enable flexible trackers. Integration of flexible batteries, flexible antennas for various wireless standards, flexible electronic circuits, as well as rigid components into a Smart Tape. Integrating loops of wires into the Smart Tape to identify whether or not the tape is mounted or whether a box is opened (e.g., the wire being broken). Integrating a wire/wireless network to connect components on the tape to one or more controllers on the tape. System architecture and circuit instantiations that are modular in that the Smart Tape can be cut while electrically retaining key features (e.g., potentially using a specific cut line). Techniques and methods to integrate a sensor hub in the Smart Tape such as environmental factors, temperature, pressure, movement, acceleration, humidity, vibration, shock, fullness, weight, physical properties, altitude. Fully leverage the physical dimensions of the tape to optimize performance (e.g., large antenna, large battery). Integration of mechanism for automatic turn-on upon affixing. Integrating intrusion detection mechanism. Integration data encryption capabilities.

The use of various wireless standards with antennas and architectures suitable for Smart Tape. The use of traditional cellular technologies or new standards like LORA or SigFox. The hubs can either be traditional cellular hubs or new hubs to support LORA or SigFox.

Deployment of a monitor system ("dummy tracker") to monitor environmental aspects affecting network performance in order to collect the data that can be used to optimize overall system performance during run-time Monitor and analyze the relationship between accuracy and sensitivity as function of time and space. Development of models of network performance to compensate for any non-idealities. Identify implicitly or explicitly the number of hubs and the impact of static or dynamic objects on the performance of the communication or locationing system, and subsequently optimize the performance. Algorithms to optimize the performance by turning on or off hubs, by averaging a number of measurements, by (partially) ignoring certain measurements. For example, algorithms may include artificial intelligence algorithms to optimally use the measured data to minimize the error compared to the actual facts.

Permutations of various locationing technologies optimized for Smart Tape. Sharing or dedicated antennas leveraging the large form factor of Smart Tape. Reduce thickness at the cost of more surface area to further optimize the architecture for Smart Tape applications. Support multiple protocols and technologies enabled by larger batteries that leverage the surface area of a tape. Combine locationing using multiple standards (RFID, Wi-Fi, LoRa, 3G, Bluetooth) in combination with other sensors (gyrators, accelerometers) or other wireless standards to improve accuracy.

Algorithms to calculate the best location of base stations given requirements of the specific Smart Tape. Geo-fencing objectives (vs. optimizing positioning for accuracy, optimize positioning for specific geo-fencing lines or other locationing objectives). Locationing of a hub at a certain floor knowing that other floors are address thru other means. Locationing of hubs near major obstacles. Simulation environment to optimally select the locations. The tools can use calibration logs to help identify the best solution.

Specific tracker that function in hostile environments. Specific application specific solution with circuitries that can operate −60 dec. Integration of cooling or ruggedization.

Integration in big data analytics solutions to optimize end-to-end delivery with adaptive rerouting.

Integration of additional sensors. Techniques and methods to integrate microphones into systems. Systems and methods to deploy a microphone in combination with voice or event recognition algorithms to identify certain actions that happen with certain units to increase functionality or reduce cost, Techniques and methods to integrate cameras into systems. Techniques and methods to integrate bar-code readers into systems. Techniques and methods to detect gas and chemicals integrated with localization units. Systems to identify risk profiles based on measured gas or chemical properties optimized for applications such as drugs law enforcement, food staleness, terrorist attacks.

Techniques and methods to integrate connectivity in systems using a hierarchical approach. Architectures to combine one or more different wireless standard like LORA, SigFox, Bluetooth, BLE, NFC, 2G, 3G, 4G, 5G, RFID, in master/slave configurations for example to create dynamic mesh creation to optimize battery life and system performance. Including novel Master/slave architectures for Bluetooth connected sensors. Hierarchy can go from product, box, container, boats or planes, airports or docks, smart cities and smart highways (such as road side units). Techniques and methods to do localization using triangulation, wireless, and sound beacons. System to optimally partition triangulation techniques with beacons in order to optimize overall system performance.

Container plug to circumvent Faraday cage issues. Transfer system to communicate magnetic waves inside a faraday cage to the outside world. System that integrates a full-fledged receiver and transmitter to perform its function. System that includes both a receiving antenna as well as a transmitting antenna both inside and outside. Small plug that can be plugged into a hole that can be drilled in the faraday cage.

Techniques and methods to harvest energy in locationing units. Extend battery life or replace batteries. Systems that integrate units that conferred any physical energy to electrical energy either continuous mode or burst mode in combination with algorithms and methods optimized for the generated power profile including storage. Examples can be wireless charging or charging thru metal environments. Units can be stacked to create a charging path.

Power efficient tracking applications. Algorithms & methods that store data and sent it at convenient times. Wireless charging in containers Techniques and methods to uniquely identify multiple tracking units to prevent cyber crimes. System encrypts critical data in ways that cannot be hacked and the tracking units sent unique identifiers, either static or dynamic, either digital or analog, so that the cloud can make sure that the unit is not a fake to prevent a man-in-the-middle attack. The approach uses various proprietary formats vs. open standards.

Techniques and methods to minimize retrofit and install cost. Systems to minimize the need of wiring thru connectivity or using its environment to communicate or charge.

Integration of alarm systems. System that automatically makes a photo or otherwise identify the scenery triggered by a certain event. The gathered information can be automatically sent to a central solution. In addition, law enforcement can be automatically informed as well as evidence can be automatically collected. Non-silent alarm options such as buzzers, flashers, electric shock, as well as loudspeakers that enable real time conversation with an operator.

Algorithms to optimize the use of increased visibility in the supply chain.

Machine learning to optimize deployment of Smart Tape. Techniques to analyze real-time data regarding air, water, land, or political risks to optimize supply-chain decisions System being implemented in part or whole with printed electronics.

Use of bio-degradable materials especially related to battery technology for sustainability.

Still other embodiments are within the scope of the claims.

The invention claimed is:

1. A method performed by a tracking system comprising one or more processors executing one or more program instructions encoded in one or more non-transitory computer readable media to track a mobile target on a road network, the method comprising:
receiving, by the tracking system, a respective sequence of locationing signals from each of multiple sources of different respective locationing signal source types;
processing multiple sequences of locationing signals of different locationing signal source types to obtain position estimates for the mobile target;
determining respective aggregate locationing errors for respective map-defined paths based on respective Euclidean distances between the position estimates obtained for the mobile target and locations on the respective map-defined paths, wherein the map-defined paths correspond to respective road segments defined in a geographic map of a road network; and
selecting a map-defined path as the geographic path most likely navigated by the mobile target based on the respective aggregate locationing errors determined for the respective map-defined paths.

2. The method of claim 1, wherein the receiving comprises, by the tracking system, receiving a respective sequence of locationing signal source types comprising a satellite signal source type, a dead-reckoning signal source type, and a terrestrial wireless communication signal source type.

3. The method of claim 1, further comprising performing the selecting cyclically over respective overlapping intervals.

4. The method of claim 1, further comprising weighting ones of the position estimates with respective weights selected according to locationing signal source type.

5. The method of claim 4, wherein the weighting of ones of the position estimates associated with a particular locationing signal source type varies as a function of time.

6. The method of claim 5, wherein the weights applied to ones of the position estimates associated with a dead-reckoning signal source type vary as a function of time.

7. The method of claim 6, further comprising resetting the position estimate associated with the dead-reckoning signal source type to geographic coordinates derived from a GPS signal.

8. The method of claim 1, wherein the selecting comprises selecting the map-defined path associated with a lowest aggregate locationing error.

9. The method of claim 1, wherein the processing comprises, by one or more of the systems, iteratively identifying current respective sets of the position estimates for the mobile target in a window over respective intervals; and, for each interval, determining respective aggregate locationing errors for the map-defined paths based on the identified current respective set of the position estimates, and selecting the most likely map-defined path based on the determined respective aggregate locationing errors for the map-defined paths.

10. The method of claim 9, wherein the respective intervals overlap.

11. The method of claim 9, further comprising, in a subsequent interval, replacing at least a portion of the map-defined path selected in a preceding interval with a respective portion of a different map-defined path that has a better score in the subsequent interval than the map-defined path selected in a preceding interval.

12. The method of claim 1, further comprising partitioning computation between the mobile target and a local hub that aggregates one or more other mobile targets.

13. The method of claim 1, further comprising filtering out ones of the map-defined paths that fail to satisfy one or more limits relating to movement of the mobile target, wherein the one or more limits comprise one or more of a maximum speed of the mobile target and a maximum acceleration of the mobile target.

14. The method of claim 1, wherein the map-defined paths comprise one or more edges corresponding to respective road segments defined in a geographic database, and further comprising, for each of multiple of the position estimates, associating the position estimate with a respective one of the edges that is closest to the position estimate.

15. The method of claim 13, further comprising for each of one or more intervals, selecting a respective one of the edges based on a proportion of the position estimates in the interval that are mapped to the respective edge, and ascertaining a respective location of the mobile target on the selected edge based on the mapped locations of the position estimates on the selected edge.

16. A computer program product for execution by a computer system and comprising at least one non-transitory computer-readable medium having computer-readable program code portions embodied therein, the computer-readable program code portions comprising:
an executable code portion configured to receive a respective sequence of locationing signals from each of multiple sources of different respective locationing signal source types;
an executable code portion configured to process the multiple sequences of locationing signals of different locationing signal source types to obtain position estimates for the mobile target;
an executable code portion configured to determine respective aggregate locationing errors for respective map-defined paths based on respective Euclidean distances between the position estimates obtained for the mobile target and locations on the respective map-defined paths; and an executable code portion configured to select a map-defined path as the geographic path most likely navigated by the mobile target based on the respective aggregate locationing errors determined for the respective map-defined paths.

17. A computing device, comprising:
one or more processors; and
memory coupled to the one or more processors and storing instructions that when executed by the one or more processors causes the one or more processors to perform operations comprising:
receiving a respective sequence of locationing signals from each of multiple sources of different respective locationing signal source types;
processing the multiple sequences of locationing signals of different locationing signal source types to obtain position estimates for the mobile target;
determining respective aggregate locationing errors for respective map-defined paths based on respective Euclidean distances between the position estimates obtained for the mobile target and locations on the respective map-defined paths; and
selecting a map-defined path as the geographic path most likely navigated by the mobile target based on the respective aggregate locationing errors determined for the respective map-defined paths.

18. The computing device of claim 17, wherein, when executed by the one or more processors, the stored instructions cause the one or more processors to perform operations comprising receiving a respective sequence of locationing signal source types comprising a satellite signal source type, a dead-reckoning signal source type, and a terrestrial wireless communication signal source type.

19. The computing device of claim 17, wherein, when executed by the one or more processors, the stored instructions cause the one or more processors to perform operations comprising, for each map-defined path, selecting each edge that is associated with a largest proportion of the position estimates in an interval.

20. The computing device of claim 17, wherein, when executed by the one or more processors, the stored instructions cause the one or more processors to perform operations comprising weighting ones of the Euclidean distances with respective weights selected according to locationing signal source type.

* * * * *